United States Patent
Shimokawa et al.

(10) Patent No.: US 11,047,603 B2
(45) Date of Patent: Jun. 29, 2021

(54) ROTOR, MOTOR, AND AIR CONDITIONING APPARATUS

(71) Applicant: Mitsubishi Electric Corporation, Tokyo (JP)

(72) Inventors: Takaya Shimokawa, Tokyo (JP); Hiroki Aso, Tokyo (JP); Takanori Watanabe, Tokyo (JP); Ryogo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 85 days.

(21) Appl. No.: 16/483,502

(22) PCT Filed: Apr. 14, 2017

(86) PCT No.: PCT/JP2017/015258
§ 371 (c)(1),
(2) Date: Aug. 5, 2019

(87) PCT Pub. No.: WO2018/189881
PCT Pub. Date: Oct. 18, 2018

(65) Prior Publication Data
US 2021/0018227 A1    Jan. 21, 2021

(51) Int. Cl.
*H02K 1/27*    (2006.01)
*F25B 1/04*    (2006.01)

(52) U.S. Cl.
CPC ...... *F25B 1/04* (2013.01); *H02K 1/27* (2013.01)

(58) Field of Classification Search
CPC .................. F25B 1/04; H02K 1/27–1/2793

USPC ........................ 310/156.01–156.84
See application file for complete search history.

(56) References Cited

U.S. PATENT DOCUMENTS

2016/0036276 A1* 2/2016 Yamagishi ............... H02K 1/22
310/59

FOREIGN PATENT DOCUMENTS

| JP | H06-044382 U | 6/1994 |
|----|--------------|--------|
| JP | 2000-287398 A | 10/2000 |
| JP | 2000-295806 A | 10/2000 |
| JP | 2012-124976 A | 6/2012 |
| JP | 2016-025674 A | 2/2016 |

OTHER PUBLICATIONS

International Search Report of the International Searching Authority dated Jul. 4, 2017 for the corresponding International application No. PCT/JP2017/015258 (and English translation).

* cited by examiner

*Primary Examiner* — Thomas Truong
(74) *Attorney, Agent, or Firm* — Posz Law Group, PLC

(57) ABSTRACT

A rotor includes a shaft extending in the direction of an axis, and a rotor core including a central hole in which the shaft is inserted. The central hole includes a first central hole, a second central hole, and a third central hole in the direction of the axis. A distance from the axis to an inner circumferential surface of the third central hole is larger than a distance from the axis to an inner circumferential surface of the second central hole. The distance from the axis to the inner circumferential surface of the second central hole is larger than a distance from the axis to an inner circumferential surface of the first central hole.

18 Claims, 19 Drawing Sheets

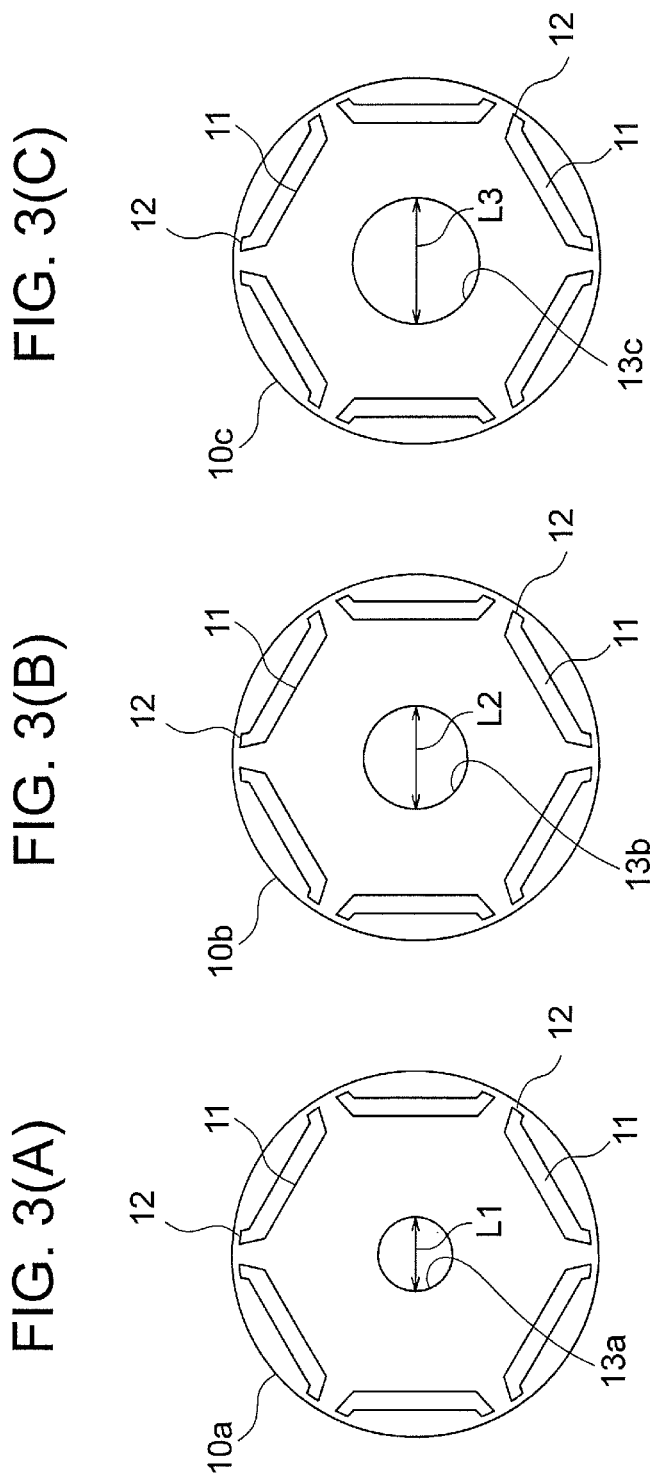

ROTOR, MOTOR, AND AIR CONDITIONING APPARATUS

CROSS REFERENCE TO RELATED APPLICATION

This application is a U.S. national stage application of International Patent Application No. PCT/JP2017/015258 filed on Apr. 14, 2017, the disclosure of which is incorporated herein by reference.

TECHNICAL FIELD

The present invention relates to a rotor, a motor using the rotor, and an air conditioning apparatus using the motor.

BACKGROUND

A rotor of a motor includes a rotor core made of, for example, a stacked body of electromagnetic steel sheets, and a shaft serving as a rotating shaft. The shaft is generally fixed by shrink fitting to a central hole formed in the rotor core. In the shrink fitting, the shaft is inserted into the central hole of the rotor core in a state where the rotor core is heated and an inner diameter of the central hole is increased.

An interior permanent magnet motor having permanent magnets embedded in a rotor is widely used (see, for example, Patent Reference 1).

PATENT REFERENCE

Patent Reference 1: Japanese Patent Application Publication No. 2012-124976 (see FIG. 7)

However, when the shaft is fixed by shrink fitting to the rotor in which the permanent magnets are embedded, the permanent magnets are heated as well as the rotor, and thus thermal demagnetization of the permanent magnets may occur.

SUMMARY

The present invention is made to solve the above described problem, and an object of the present invention is to suppress demagnetization of the permanent magnets mounted in the rotor.

A rotor according to the present invention includes a shaft extending in a direction of an axis, and a rotor core having a central hole in which the shaft is inserted. The central hole includes a first central hole, a second central hole, and a third central hole in the direction of the axis. A distance from the axis to an inner circumferential surface of the third central hole is larger than a distance from the axis to an inner circumferential surface of the second central hole. The distance from the axis to the inner circumferential surface of the second central hole is larger than a distance from the axis to an inner circumferential surface of the first central hole.

According to the present invention, when, for example, the shaft is fixed to the first central hole of the rotor core, the inner circumferential surfaces of the second central hole and the third central hole are distanced from the shaft, and thus heat generated during shrink fitting, for example, is less likely to be transmitted to an outer circumferential side of the rotor core. As a result, thermal demagnetization of the permanent magnets disposed on the outer circumferential side (for example, magnet insertion holes) of the rotor core can be suppressed. When, for example, the first central hole of the rotor core is formed to be larger than an outer diameter of the shaft, the rotor core and the shaft can be integrated with each other by resin molding or the like, and the need for shrink fitting can be eliminated. Thus, thermal demagnetization of the permanent magnets can be suppressed.

BRIEF DESCRIPTION OF THE DRAWINGS

FIGS. 3(A), 3(B) and 3(C) are plan views respectively illustrating a first part, a second part, and a third part of the rotor core according to the first embodiment.

DETAILED DESCRIPTION

First Embodiment (Configuration of Motor)

Figure 1:
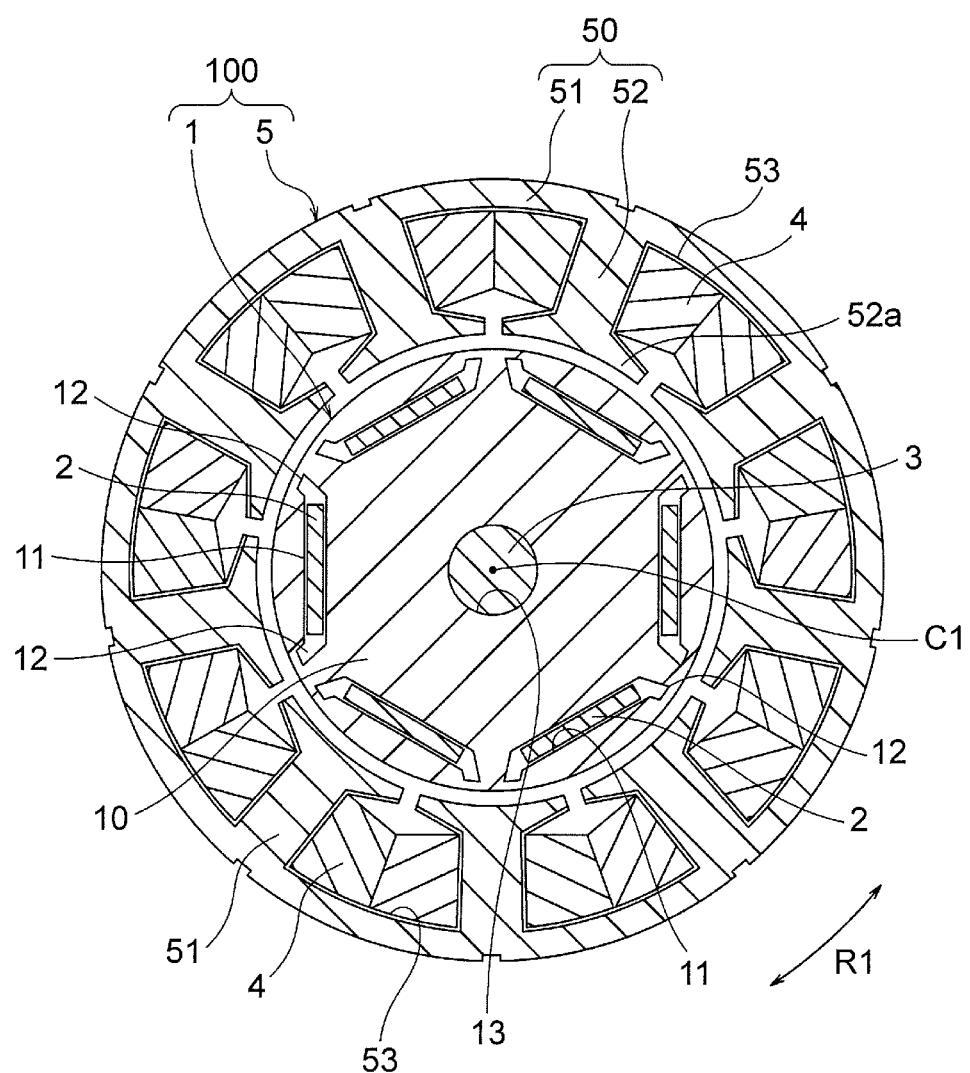
FIG. 1 is a sectional view illustrating a motor according to a first embodiment.

FIG. 1 is a sectional view illustrating a motor 100 according to a first embodiment. The motor 100 is an inner rotor type motor including a cylindrical rotor 1 and an annular stator 5 surrounding the rotor 1. An air gap of 0.5 mm, for example, is provided between the stator 5 and the rotor 1. The motor 100 is an interior permanent magnet motor having permanent magnets 2 embedded in the rotor 1. FIG. 1 is a sectional view taken along a plane perpendicular to an axis of rotation (axis C1) of the rotor 1.

Hereinafter, the axis of rotation of the rotor 1 is defined as an axis C1, and a direction of the axis C1 will be referred to as an "axial direction". A direction (indicated by an arrow R1 in FIG. 1) along a circumference about the axis C1 will be referred to as a "circumferential direction", and a radial direction about the axis C1 will be referred to as a "radial direction".

The stator 5 includes a stator core 50, and coils 4 wound around the stator core 50. The stator core 50 is made of, for example, a plurality of magnetic thin sheets, each having a thickness of 0.2 to 0.5 mm, stacked in the axial direction and fixed together by crimping or the like. As the magnetic thin sheet, an electromagnetic steel sheet containing iron (Fe) as a principal component is used in this example.

The stator core 50 includes a yoke 51 having an annular shape about the axis C1, and a plurality of teeth 52 extending inward in the radial direction (toward the axis C1) from the yoke 51. The teeth 52 are arranged at equal intervals in the circumferential direction about the axis C1. Tooth ends 52a formed at inner ends of the teeth 52 in the radial direction face an outer circumferential surface of the rotor 1 across the above described air gap. A slot is formed between every adjacent two of the teeth 52, and serves as a space for housing the coil 4. The number of teeth 52 (that is, the number of slots) is 9 in this example, but is not limited to 9.

Insulators 53 are attached to the stator core 50. The insulators 53 are provided between the stator core 50 and the coils 4 and insulate the stator core 50 and the coils 4 from each other. The insulators 53 are formed by molding resin integrally with the stator core 50 or fitting resin molded bodies molded as separate components to the stator core 50.

The insulators 53 are made of insulating resin such as polybutylene terephthalate (PBT), polyphenylene sulfide (PPS), liquid crystal polymer (LCP), or polyethylene terephthalate (PET). The insulators 53 may also be made of an insulating resin film having a thickness of 0.035 to 0.4 mm.

The coils 4 are wound around the teeth 52 via the insulators 53. The coil 4 is made of material containing copper or aluminum as a principal component. The coil 4 may be wound around every tooth 52 (concentrated winding), or may be wound across a plurality of teeth 52 (distributed winding). The stator 5 is covered with a mold resin part 55 (FIG. 15), which will be described later.

(Configuration of Rotor)

The rotor 1 includes a rotor core 10 having a cylindrical shape about the axis C1. The rotor core 10 is made of a plurality of magnetic thin sheets, each having a thickness of 0.2 to 0.5 mm, stacked in the axial direction and fixed together by crimping or the like. As the magnetic thin sheet, an electromagnetic steel sheet containing iron as a principal component is used in this example.

Figure 15:
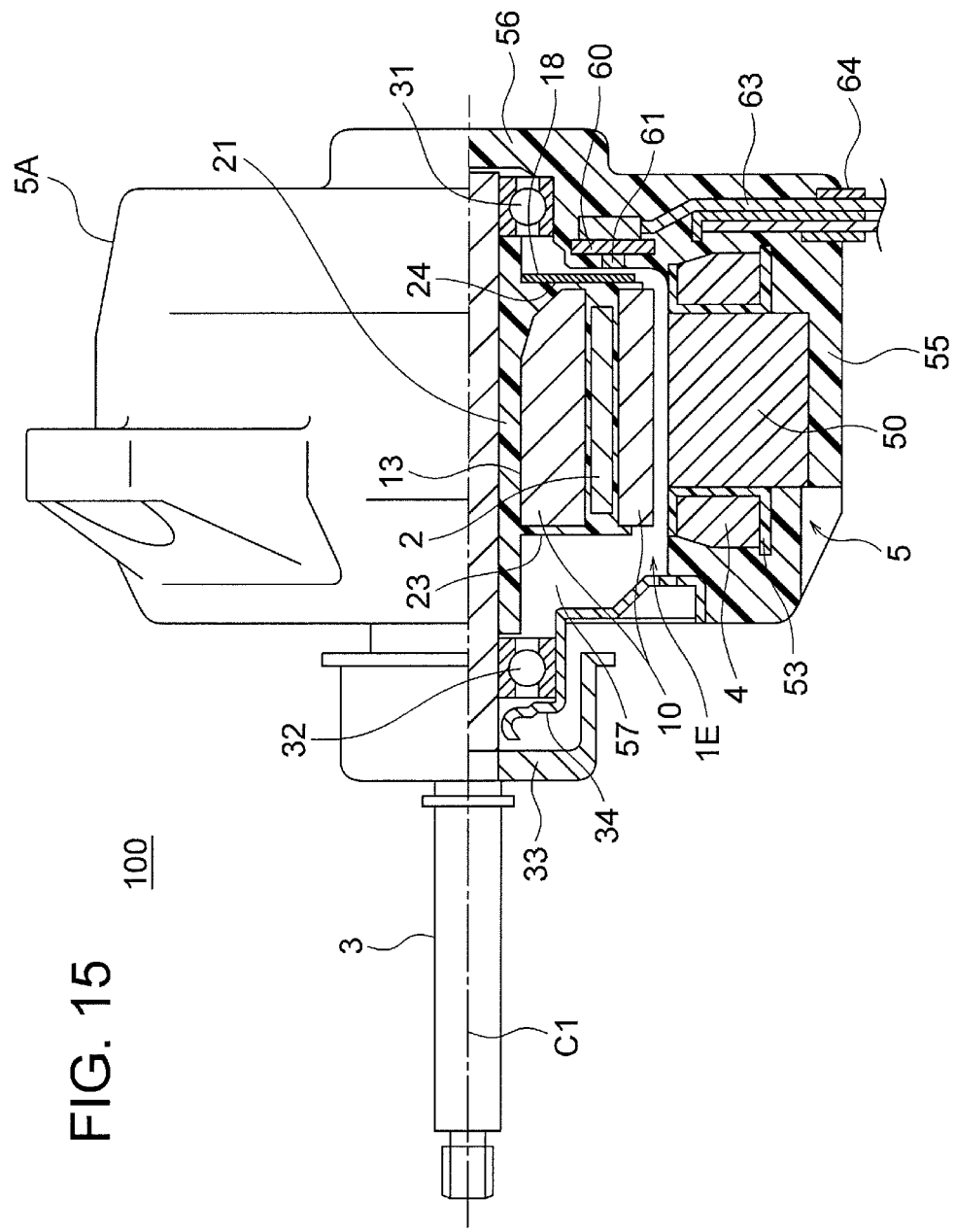
FIG. 15 is a sectional view illustrating a motor to which the rotor according to each of the embodiments is applied.

The rotor core 10 includes a central hole 13 at its center in the radial direction. The central hole 13 passes through the rotor core 10 in the axial direction, has a circular cross section, and serves as a shaft insertion hole. A shaft 3 is fixed inside the central hole 13 and rotatably supported by bearings 31 and 32 (FIG. 15). The above described axis C1 corresponds to a central axis of the shaft 3. The shaft 3 is made of, for example, metal such as nickel (Ni) or chromium (Cr).

A plurality of magnet insertion holes 11 are formed along an outer circumferential surface of the rotor core 10. In this example, six magnet insertion holes 11 are arranged at equal intervals in the circumferential direction, but the number of magnet insertion holes 11 is not limited to 6.

Plate-like permanent magnets 2 are inserted into the magnet insertion holes 11. In this example, the number of magnet insertion holes 11 is 6, and the number of permanent magnets 2 is also 6. In other words, the rotor 1 has six magnetic poles. However, the number of magnetic poles is not limited to 6.

The permanent magnet 2 is a flat plate member elongated in the axial direction, and has a width in the circumferential direction of the rotor core 10 and a thickness in the radial direction of the rotor core 10. The permanent magnet 2 is made of, for example, a rare-earth magnet containing neodymium (Nd) or samarium (Sm) as a principal component, or a ferrite magnet containing iron as a principal component. The permanent magnet 2 is magnetized in a direction of the thickness (the radial direction of the rotor core 10).

In this example, one permanent magnet 2 is disposed in one magnet insertion hole 11, but a plurality of permanent magnets 2 may be arranged in one magnet insertion hole 11 side by side in the circumferential direction. In such a case, the plurality of permanent magnets 2 in the same magnet insertion hole 11 are magnetized so that the same magnetic poles face outward in the radial direction.

A flux barrier (a leakage magnetic flux suppression hole) 12 is formed continuously with each end of the magnet insertion hole 11 in the circumferential direction. The flux barrier 12 suppresses leakage magnetic flux between adjacent permanent magnets 2. A core part between the flux barrier 12 and the outer circumference of the rotor core 10 forms a thin-wall part (also called a bridge part) to suppress short-circuit of magnetic flux between the adjacent permanent magnets 2. A thickness of the thin-wall part is desirably equal to the thickness of the electromagnetic steel sheet of the rotor core 10.

Figure 2A:
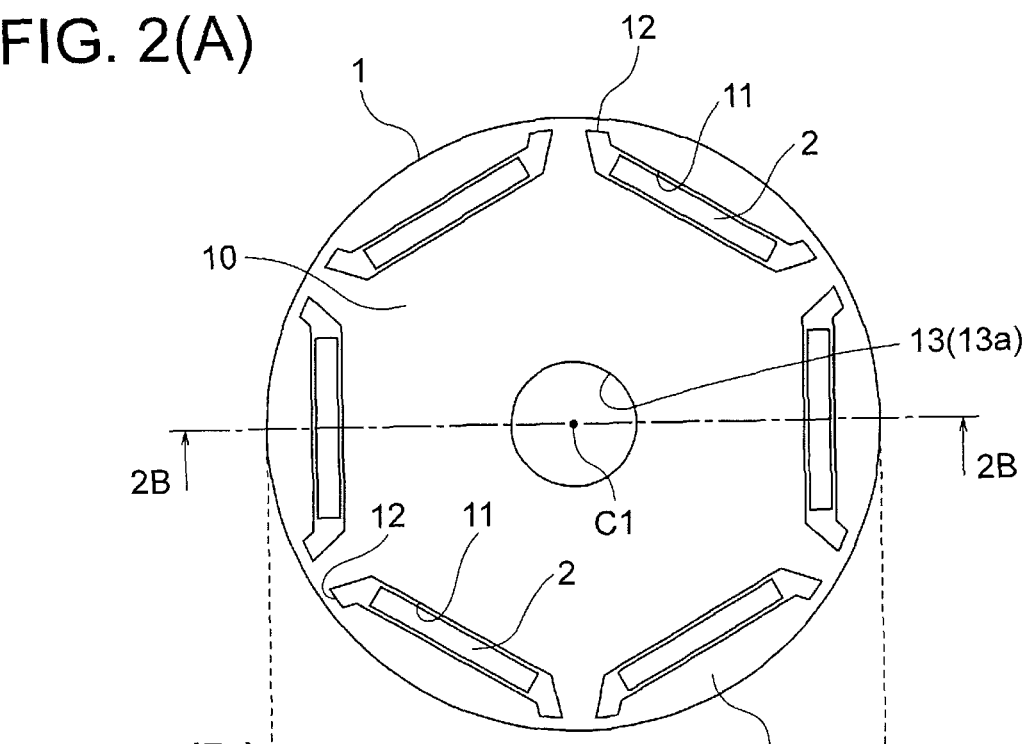
FIGS. 2(A) and 2(B) are respectively a plan view and a sectional view illustrating a rotor core and permanent magnets of the motor according to the first embodiment.
Figure 2B:
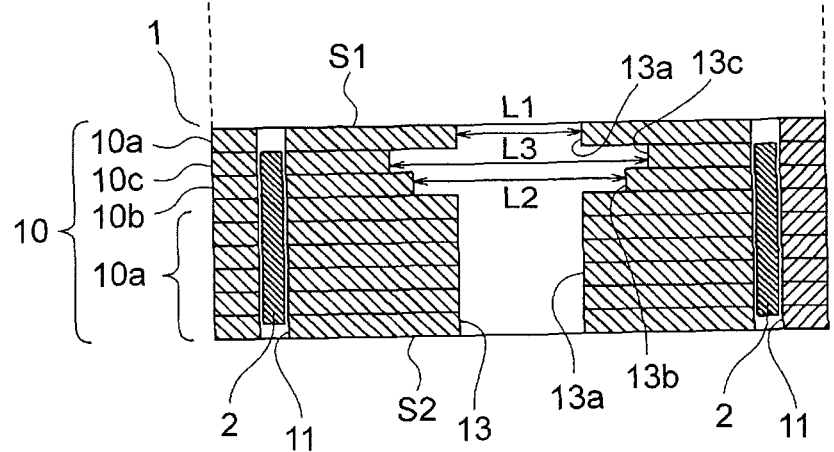

FIG. 2(A) is a plan view illustrating the rotor core 10 and the permanent magnets 2. FIG. 2(B) is a sectional view, taken along a line 2B-2B illustrated in FIG. 2(A), as seen in a direction indicated by arrows. The rotor core 10 includes first parts 10a, a second part 10b, and a third part 10c in the axial direction, as illustrated in FIG. 2(B).

In this example, one end face (upper end face in FIG. 2(B)) of the rotor core 10 in the axial direction is defined as a first end face S1, and the other end face of the rotor core 10 in the axial direction is defined as a second end face S2. In this regard, vertical positions in FIG. 2(B) are merely for the sake of convenience in explaining a configuration of the rotor core 10.

The first part 10a is disposed on the first end face S1 side of the rotor core 10. The third part 10c is disposed adjacent to the first part 10a in the axial direction. The second part 10b is disposed adjacent to the third part 10c on a side opposite to the first part 10a across the third part 10c in the axial direction.

Another first part 10a is disposed on the second end face S2 side with respect to the second part 10b. As a sum of thicknesses of the first parts 10a increases, the rotor core 10 and the shaft 3 can be fixed to each other more tightly.

Each of the first parts 10a, the second part 10b, and the third part 10c is formed by a stacked body obtained by stacking a plurality of electromagnetic steel sheets. In FIG. 2(B), for the sake of illustrative convenience, the rotor core 10 is illustrated as being divided at equal intervals in the axial direction, but a thickness of one electromagnetic steel sheet of the rotor core 10 is thinner than the illustrated interval.

The central hole 13 passes through the first parts 10a, the second part 10b, and the third part 10c. A part of the central hole 13 included in the first part 10a is defined as a first central hole 13a. A part of the central hole 13 included in the second part 10b is defined as a second central hole 13b, and a part of the central hole 13 included in the third part 10c is defined as a third central hole 13c.

The first central hole 13a has an inner diameter L1. The second central hole 13b has an inner diameter L2. The third central hole 13c has an inner diameter L3. The inner diameters (each of which is twice a distance from the axis C1 to an inner circumferential surface) L1, L2, and L3 of the central holes 13a, 13b, and 13c satisfy L1<L2<L3.

More specifically, the first central hole 13a having the inner diameter L1 (minimum inner diameter), the third central hole 13c having the inner diameter L3 (maximum inner diameter), and the second central hole 13b having the inner diameter L2 (intermediate inner diameter) are arranged in this order from the first end face S1 side, and the first central hole 13a having the inner diameter L1 (minimum inner diameter) is further disposed adjacent to the second central hole 13b.

The magnet insertion holes 11 in which the permanent magnets 2 are inserted pass through the rotor core 10 in the axial direction. A length of each permanent magnet 2 in the axial direction is shorter than a length of the rotor core 10 in the axial direction (that is, a length of the magnet insertion hole 11 in the axial direction), and thus the permanent magnets 2 are disposed at positions retracted inward in the axial direction from the first end face S1. That is, the end faces (the upper end faces in FIG. 2(B)) of the permanent magnets 2 are disposed in the third part 10c. In other words, corner portions of the permanent magnets 2 in which demagnetization is most likely to occur are disposed in the third part 10c.

FIGS. 3(A), 3(B), and 3(C) are plan views illustrating the first part 10a, the second part 10b, and the third part 10c, respectively, of the rotor core 10. The first part 10a includes the circular first central hole 13a (inner diameter L1), the second part 10b includes the circular second central hole 13b (inner diameter L2), and the third part 10c includes the circular third central hole 13c (inner diameter L3), as illustrated in FIGS. 3(A), 3(B), and 3(C).

The first parts 10a, the second part 10b, and the third part 10c are formed of stacked bodies of electromagnetic steel sheets having different shapes as above. The central hole 13 for inserting the shaft 3 (FIG. 1) is formed by stacking the first parts 10a, the second part 10b, and the third part 10c in the axial direction.

(Functions)

Figure 4A:
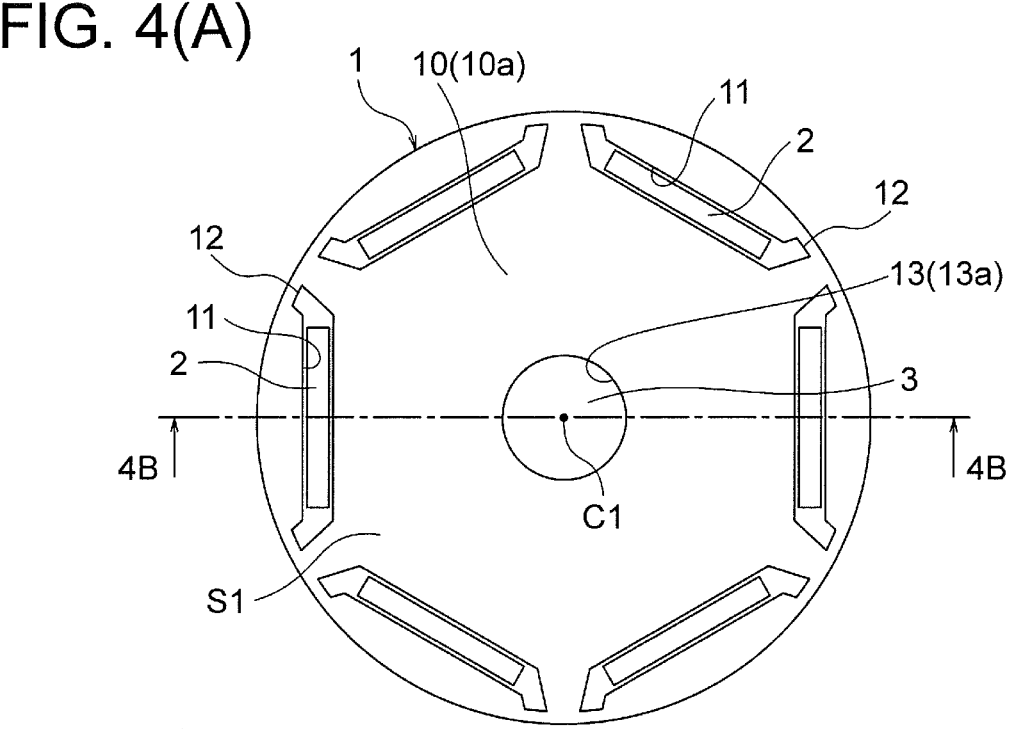
FIGS. 4(A) and 4(B) are respectively a plan view and a sectional view illustrating a state where a shaft is inserted into the rotor core illustrated in FIGS. 2 (A) and 2(B).
Figure 4B:
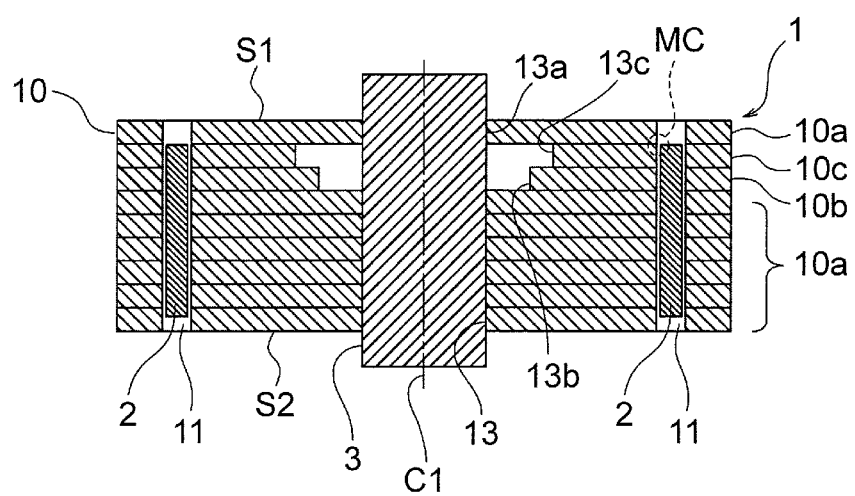

Next, functions and effects of the rotor 1 according to the first embodiment will be described. FIG. 4(A) is a plan view illustrating a state where the shaft 3 is inserted in the rotor core 10. FIG. 4(B) is a sectional view, taken along a line 4B-4B illustrated in FIG. 4(A), as seen in a direction indicated by arrows. When the shaft 3 is inserted into the central hole 13, the shaft 3 is fitted into the first central holes 13a.

Inner circumferential surfaces of the second central hole 13b and the third central hole 13c are distanced from the shaft 3. In other words, a gap is formed between an outer circumferential surface of the shaft 3 and inner circumferential surfaces of the second central hole 13b and the third central hole 13c.

When the shaft 3 is inserted into the rotor core 10, shrink fitting is performed. The shrink fitting process is performed so that the permanent magnets 2 are inserted in the magnet insertion holes 11 of the rotor core 10. The shrink fitting process includes a heating process, a shaft insertion process, and a cooling process. In the heating process, a cylindrical rod separate from the shaft 3 is inserted into the central hole 13 of the rotor core 10. Then, the rod is heated so that the rotor core 10 is heated and the inner diameter of the central hole 13 increases.

After the inner diameter of the central hole 13 of the rotor core 10 increases, the rod is pulled out of the central hole 13, and the shaft 3 is inserted into the central hole 13 (shaft insertion process). Then, the rotor core 10 with the shaft 3 inserted into the central hole 13 is placed in room temperature environment or low temperature environment to thereby cool the rotor core 10 (cooling process). When the rotor core 10 is cooled, the inner diameter of the central hole 13 decreases, and the shaft 3 is fitted into the central hole 13. Accordingly, the shaft 3 is fixed to the central hole 13 of the rotor core 10.

In the above described heating process, the heat transmitted to the rotor core 10 is also transmitted to the permanent magnets 2 in the magnet insertion holes 11. When the permanent magnets 2 are applied with heat in excess of a threshold, the permanent magnets 2 are subjected to irreversible demagnetization (also called thermal demagnetization). If such demagnetization occurs, even after the temperature of the permanent magnets 2 returns to room temperature, the magnetic force of the permanent magnets 2 is lowered as compared to that before shrink fitting. The corner portions of the permanent magnets 2 are particularly prone to thermal demagnetization.

In the first embodiment, the central hole 13 of the rotor core 10 includes the first central holes 13a, the second central hole 13b, and the third central hole 13c. The shaft 3 is fitted into the first central holes 13a, while the inner circumferential surfaces of the second central hole 13b and the third central hole 13c are distanced from the shaft 3.

More specifically, in the heating process of shrink fitting, the inner circumferential surfaces of the second central hole 13b and the third central hole 13c are distanced from the heating rod. Therefore, heat is less likely to be transmitted to an outer circumferential side of the third part 10c including the third central hole 13c having the inner diameter L3 (maximum inner diameter).

Thus, since the corner portions (denoted by reference symbol MC in FIG. 4(B)) of the permanent magnets 2 in which thermal demagnetization is most likely to occur are disposed in the magnet insertion holes 11 of the third part 10c, thermal demagnetization of the permanent magnets 2 can be suppressed.

Since the central hole 13 of the rotor core 10 includes the second central hole 13b having the inner diameter L2, the gap can be reduced as compared to a case where the central hole 13 except for the first central holes 13a are all formed by the third central hole 13c. Thus, reduction in rigidity of the rotor core 10 can be suppressed.

In this example, the third central hole 13c is provided on one end side (the first end face S1 side) of the rotor core 10 in the axial direction, but the third central hole 13c may be provided on each of both end sides (the first end face S1 side and the second end face S2 side) of the rotor core 10 in the axial direction. With this arrangement, thermal demagnetization of the corner portions on both ends of the permanent magnets 2 in the axial direction can be suppressed.

In this example, the central hole 13 of the rotor core 10 includes three central holes 13a, 13b, and 13c having different inner diameters (that is, having different distances from the axis to the inner circumferential surfaces), but the central hole 13 may include four or more central holes having different inner diameters.

Effects of Embodiment

As described above, in the first embodiment of the present invention, the central hole 13 of the rotor core 10 includes the first central holes 13a having the inner diameter L1, the second central hole 13b having the inner diameter L2 larger than the inner diameter L1, and the third central hole 13c having the inner diameter L3 larger than the inner diameter L2. More specifically, the distance from the axis C1 to the inner circumferential surface of the third central hole 13c is larger than the distance from the axis C1 to the inner circumferential surface of the second central hole 13b, and the distance from the axis C1 to the inner circumferential surface of the second central hole 13b is larger than the distance from the axis C1 to the inner circumferential surface of the first central hole 13a. Therefore, the shaft 3 can be fitted into the first central holes 13a, and the inner circumferential surfaces of the second central hole 13b and the third central hole 13c can be distanced from the shaft 3. Thus, during the shrink fitting, heat is less likely to be transmitted to the magnet insertion holes 11 provided on the outer circumferential side of the rotor core 10. This makes it possible to suppress thermal demagnetization of the permanent magnets 2 in the magnet insertion holes 11.

Since the central hole 13 includes the second central hole 13b having the inner diameter L2, reduction in rigidity of the rotor core 10 can be reduced as compared to the case where the central hole 13 except for the first central holes 13a are all formed by the third central hole 13c.

Since one end of each permanent magnet 2 in the axial direction is disposed in the magnet insertion hole 11 of the third part 10c of the rotor core 10, heat is less likely to be transmitted to portions (corner portions) of the permanent magnets in which thermal demagnetization is most likely to occur. Thus, thermal demagnetization of the permanent magnets 2 can be effectively suppressed.

Since the first central holes 13a are disposed at both ends of the rotor core 10 in the axial direction, the rotor core 10 and the shaft 3 can be tightly fixed to each other.

Second Embodiment

Figure 5A:
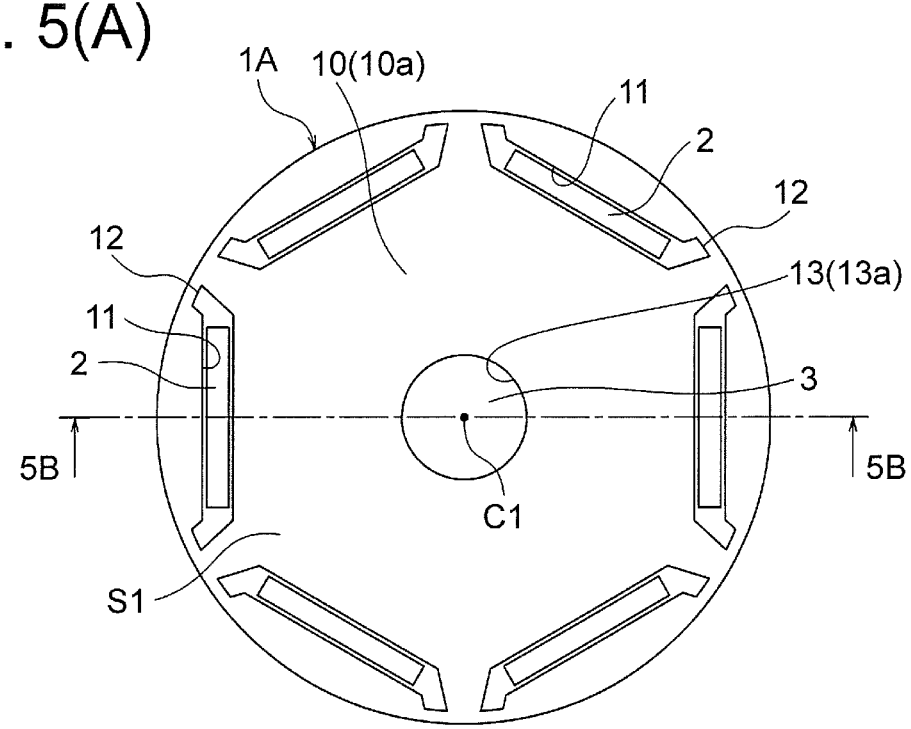
FIGS. 5(A) and 5(B) are respectively a plan view and a sectional view illustrating a rotor according to a second embodiment.
Figure 5B:
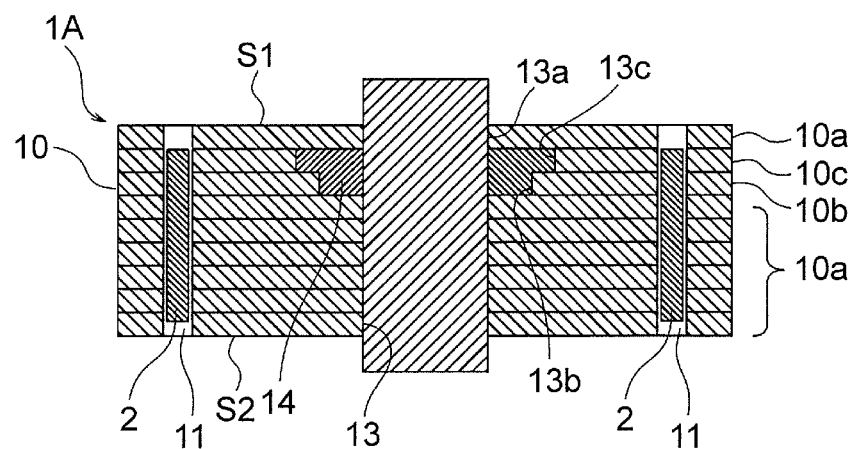

Next, a second embodiment of the present invention will be described. FIG. 5(A) is a plan view illustrating a rotor 1A according to the second embodiment. FIG. 5(B) is a sectional view, taken along a line 5B-5B illustrated in FIG. 5(A), as seen in a direction indicated by arrows.

The rotor 1A according to the second embodiment includes the rotor core 10 and the shaft 3 which are similar to those in the first embodiment. However, a resin part (first resin part) 14 is provided in a space between the outer circumferential surface of the shaft 3 and the inner circumferential surfaces of the second central hole 13b and the third central hole 13c of the rotor core 10. The resin part 14 is made of, for example, thermoplastic resin such as PBT.

Since the resin part 14 is provided between the outer circumferential surface of the shaft 3 and the inner circumferential surfaces of the second central hole 13b and the third central hole 13c as above, rigidity of the rotor 1A can be enhanced as compared to the first embodiment. The resin part 14 has a lower thermal conductivity than the electromagnetic steel sheets of the rotor core 10, and thus an effect of suppressing thermal demagnetization of permanent magnets 2 can be obtained, as in the first embodiment.

A motor according to the second embodiment is the same as the motor 100 (FIG. 1) described in the first embodiment, except that the rotor 1A includes the resin part 14.

In manufacturing the rotor 1A, the resin part 14 can be formed by fixing the shaft 3 to the central hole 13 of the rotor core 10 by shrink fitting, and then injecting resin into the space between the outer circumferential surface of the shaft 3 and the inner circumferential surfaces of the central holes 13b and 13c of the rotor core 10. The resin can be injected into the space from, for example, a hole (not illustrated) formed in the first part 10a of the rotor core 10.

As described above, in the second embodiment, since the resin part 14 is provided between the outer circumferential surface of the shaft 3 and the inner circumferential surfaces of the second central hole 13b and the third central hole 13c of the rotor core 10, thermal demagnetization of the permanent magnets 2 can be suppressed and rigidity of the rotor 1 can be enhanced.

Third Embodiment

Figure 6A:
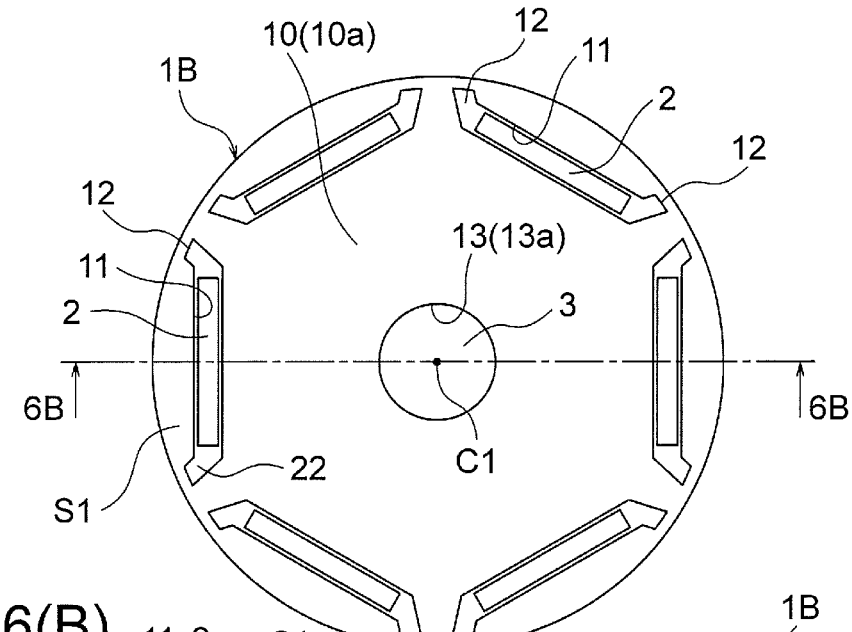
FIGS. 6(A), 6(B) and 6(C) are respectively a plan view, a sectional view, and a bottom view illustrating a rotor according to a third embodiment.
Figure 6B:
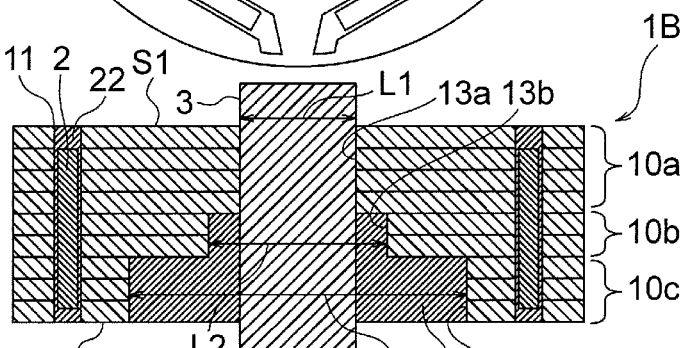
Figure 6C:
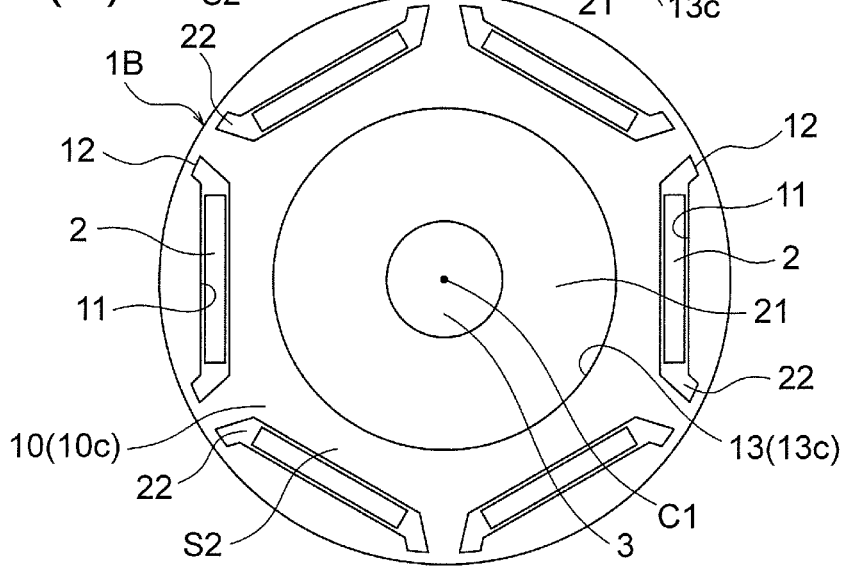

Next, a third embodiment of the present invention will be described. FIG. 6(A) is a plan view illustrating a rotor 1B according to the third embodiment. FIG. 6(B) is a sectional view, taken along a line 6B-6B illustrated in FIG. 6(A), as seen in a direction indicated by arrows. FIG. 6(C) is a bottom view illustrating the rotor 1B according to the third embodiment.

The rotor 1B according to the third embodiment includes a rotor core 10 having a configuration different from that of the rotor core 10 of the rotor 1 according to the first embodiment, as illustrated in FIG. 6(A). The rotor core 10 of the rotor 1B according to the third embodiment includes the magnet insertion holes 11 and the flux barriers 12 described in the first embodiment.

The rotor core 10 of the rotor 1B includes the first part 10a, the second part 10b, and the third part 10c from the first end face S1 toward the second end face S2, as illustrated in FIG. 6(B). The first part 10a includes the first central hole 13a having the inner diameter L1. The second part 10b includes the second central hole 13b having the inner diameter L2. The third part 10c includes the third central hole 13c having the inner diameter L3. The central holes 13a, 13b, and 13c constitute the central hole 13 in which the shaft 3 is inserted.

The inner diameters L1, L2, and L3 of the central holes 13a, 13b, and 13c satisfy L1<L2<L3. In other words, the third central hole 13c having the inner diameter L3 (maximum inner diameter), the second central hole 13b having the inner diameter L2 (intermediate inner diameter), and the first central hole 13a having the inner diameter L1 (minimum inner diameter) are arranged in this order from the second end face S2 side (that is, one end side) of the rotor core 10. More specifically, the central hole 13 of the rotor core 10 is formed so that its inner diameter increases stepwise toward the second end face S2.

The shaft 3 is fitted into the first central hole 13a of the rotor core 10. A resin part 21 (first resin part) is provided in the space between the outer circumferential surface of the shaft 3 and the inner circumferential surfaces of the second central hole 13b and the third central hole 13c. The resin part 21 is made of, for example, thermoplastic resin such as PBT. The resin part 21 is exposed on the second end face S2 side of the rotor core 10, as illustrated in FIG. 6(C).

A resin part 22 (second resin part) is also provided in the magnet insertion hole 11 of the rotor core 10. The resin part 22 is made of material similar to that of the resin part 21. For example, the resin part 22 is made of thermoplastic resin such as PBT. Since the magnet insertion hole 11 and the flux barriers 12 are continuous with each other, the resin part 22 is further provided in each of the flux barriers 12.

One end (the end of the second end face S2 side) of each permanent magnet 2 in the axial direction is disposed in the magnet insertion hole 11 of the third part 10c. Thus, during the process in which the shaft 3 is fitted into the rotor core 10 by shrink fitting, heat is less likely to be transmitted to the corner portions of the permanent magnet 2 at the above described one end.

Figure 7:
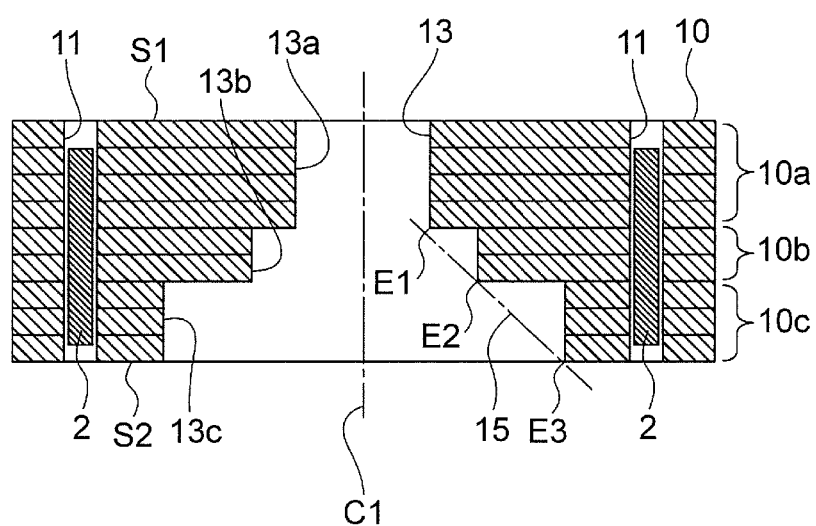
FIG. 7 is a sectional view illustrating a rotor core of the rotor according to the third embodiment.

FIG. 7 is a sectional view illustrating the rotor core 10 according to the third embodiment. In FIG. 7, an end edge of the inner circumferential surface of the first central hole 13a on the second end face S2 side (the lower side in FIG. 7) is defined as an end edge E1 (first end edge). An end edge of the inner circumferential surface of the second central hole 13b on the second end face S2 side is defined as an end edge E2 (second end edge). An end edge of the inner circumferential surface of the third central hole 13c on the second end face S2 side is defined as an end edge E3 (third end edge). The end edges E1, E2, and E3 are located on an inclined plane 15 inclined with respect to the axis C1. The inclined plane 15 is a virtual plane.

The rotor 1B according to the third embodiment is formed by fixing the shaft 3 to the rotor core 10 by shrink fitting, and then molding the shaft 3 and the rotor core 10 with resin. In the molding process, the rotor core 10 with the shaft 3 fixed thereto is placed in a molding mold. Since a clearance is provided between the outer circumferential surface of the rotor core 10 and an inner circumferential surface of the molding mold, the rotor core 10 is displaceable in the radial direction by the clearance in the molding mold. As a result, the central axis (axis C1) of the rotor core 10 may tilt in the molding mold.

In the rotor core 10 according to the third embodiment, the end edges E1, E2, and E3 of the central holes 13a, 13b, and 13c are located on the inclined plane 15 as described above. Therefore, when the rotor core 10 is placed in the molding mold so that the second end face S2 faces downward, the end edges E1, E2, and E3 of the central holes 13a, 13b, and 13c abut against a tapered part provided in the molding mold. Thus, the tilt of the central axis of the rotor core 10 can be suppressed, and the rotor core 10 can be positioned in the molding mold.

After the rotor core 10 with the shaft 3 fixed thereto is placed in the molding mold, resin is injected into the molding mold so that an interior of the central hole 13 and interiors of the magnet insertion holes 11 (including interiors of the flux barriers 12) of the rotor core 10 are filled with the resin, thereby forming the resin parts 21 and 22, respectively, as illustrated in FIG. 6(B). Details of the molding mold used for molding will be described later with reference to FIGS. 16 and 17.

In this example, all the end edges E1, E2, and E3 of the central holes 13a, 13b, and 13c of the rotor core 10 abut against the tapered part of the molding mold. However, it is also possible that the end edges E2 and E3 of the central holes 13b and 13c or the end edges E1 and E3 of the central holes 13a and 13c abut against the tapered part of the molding mold.

In this example, furthermore, the central hole 13 of the rotor core 10 includes three central holes 13a, 13b, and 13c having different inner diameters (that is, having different distances from the axis to the inner circumferential surfaces), but the central hole 13 may include four or more central holes having different inner diameters.

A motor according to the third embodiment is the same as the motor 100 (FIG. 1) described in the first embodiment, except for the configuration of the rotor 1B.

As described above, in the third embodiment, the central hole 13 of the rotor core 10 includes the third central hole 13c having the inner diameter L3, the second central hole 13b having the inner diameter L2, and the first central hole 13a having the inner diameter L1 arranged in this order from one end side (second end face S2 side) in the axial direction, and L1<L2<L3 is satisfied. Therefore, when the rotor core 10 is placed in the molding mold, the end edges E1, E2, and E3 formed on the inner circumferential surfaces of the central holes 13a, 13b, and 13c abut against the tapered part of the molding mold, and thus the rotor core 10 can be positioned in the molding mold.

Fourth Embodiment

Figure 8A:
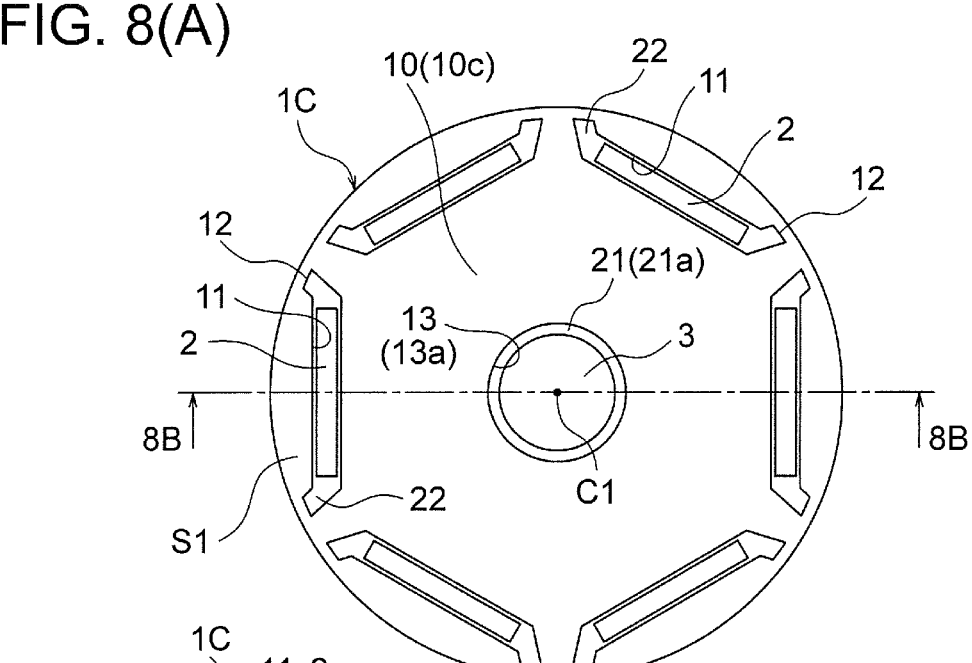
FIGS. 8(A), 8(B) and 8(C) are respectively a plan view, a sectional view, and a bottom view illustrating a rotor according to a fourth embodiment.
Figure 8B:
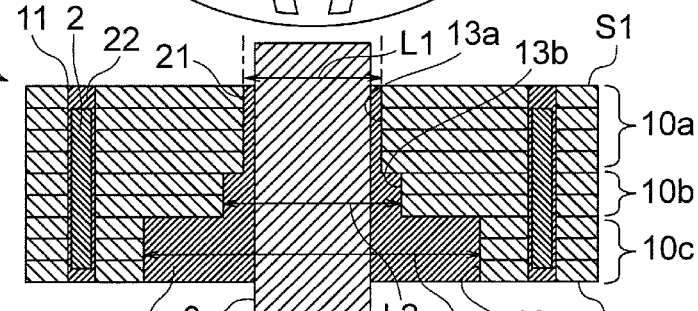
Figure 8C:
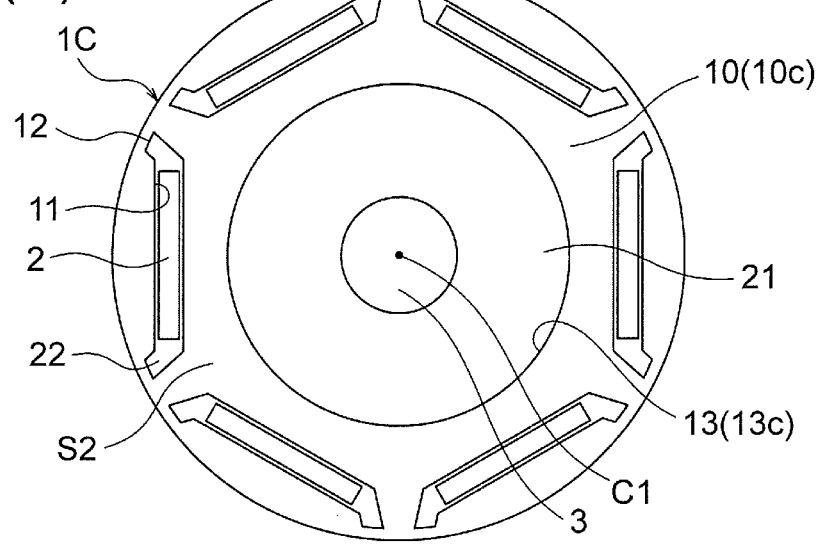

Next, a fourth embodiment of the present invention will be described. FIG. 8(A) is a plan view illustrating a rotor 1C according to the fourth embodiment. FIG. 8(B) is a sectional view, taken along a line 8B-8B illustrated in FIG. 8(A), as seen in a direction indicated by arrows. FIG. 8(C) is a bottom view illustrating the rotor 1C according to the fourth embodiment.

The rotor 1C according to the fourth embodiment includes a rotor core 10 having a configuration different from that of the rotor core 10 of the rotor 1 according to the first embodiment, as illustrated in FIG. 8(A). The rotor core 10 of the rotor 1C according to the fourth embodiment includes the magnet insertion holes 11 and the flux barriers 12 described in the first embodiment.

The rotor core 10 of the rotor 1C includes the first part 10a, the second part 10b, and the third part 10c from the first end face S1 toward the second end face S2, as illustrated in FIG. 8(B). The first part 10a includes the first central hole 13a having the inner diameter L1. The second part 10b includes the second central hole 13b having the inner diameter L2. The third part 10c includes the third central hole 13c having the inner diameter L3. The central holes 13a, 13b, and 13c constitute the central hole 13 in which the shaft 3 is inserted.

In the fourth embodiment, the inner diameter L1 of the first central hole 13a is larger than the outer diameter of the shaft 3. In other words, the inner circumferential surface of the first central hole 13a is distanced from the outer circumferential surface of the shaft 3. The second central hole 13b and the third central hole 13c are formed in the same manner as those according to the third embodiment.

The resin part 21 described in the third embodiment is provided in the second central hole 13b and the third central hole 13c. In the fourth embodiment, the resin part 21 also enters an interior of the first central hole 13a (that is, a space between the inner circumferential surface of the first central hole 13a and the outer circumferential surface of the shaft 3).

In the fourth embodiment, the shaft 3 is surrounded by the resin part 21 over an entire area of the rotor core 10 in the axial direction. Thus, the shaft 3 and the rotor core 10 can be integrated with each other by being molded with resin. This makes it unnecessary to fix the shaft 3 to the central hole 13 of the rotor core 10 by shrink fitting, and thus thermal demagnetization of the permanent magnets 2 can be effectively suppressed.

Figure 9:
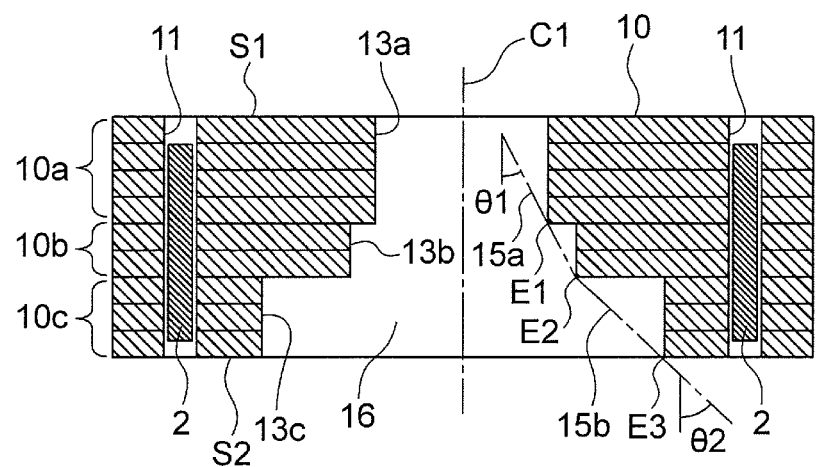
FIG. 9 is a sectional view illustrating a rotor core of the rotor according to the fourth embodiment.

FIG. 9 is a sectional view illustrating the rotor core 10 according to the fourth embodiment. In FIG. 9, the end edge (that is, the end edge of the inner circumferential surface on the second end face S2 side) E1 of the first central hole 13a of the rotor core 10, and the end edge E2 of the second central hole 13b are located on an inclined plane 15a inclined at an angle θ1 with respect to the axis C1.

The end edge E2 of the second central hole 13b, and the end edge E3 of the third central hole 13c are located on an inclined plane 15b inclined at an angle θ2 with respect to the axis C1. The angle θ2 is larger than the angle θ1. Both of the inclined planes 15a and 15b are virtual planes.

During the molding process, the rotor core 10 and the shaft 3 are placed in the molding mold. As described in the third embodiment, since a clearance is provided between the outer circumferential surface of the rotor core 10 and the inner circumferential surface of the molding mold, the rotor core 10 is displaceable in the radial direction by the clearance in the molding mold. In the fourth embodiment, furthermore, when the rotor core 10 and the shaft 3 are placed in the molding mold, central axes of the rotor core 10 and the shaft 3 are not yet aligned with each other.

In the rotor core 10 according to the fourth embodiment, the end edges E2 and E3 of the central holes 13b and 13c are located on the inclined plane 15b (FIG. 9), and thus abut against the tapered part of the molding mold when the rotor core 10 is placed in the molding mold. Thus, the rotor core 10 can be positioned in the molding mold, and coaxiality between the rotor core 10 and the shaft 3 can be enhanced.

The end edges E1, E2, and E3 of the central hole 13 of the rotor core 10 may be located on a single inclined plane 15, as illustrated in FIG. 7. In such a case, however, if the angle of the inclined plane 15 with respect to the axis C1 is excessively increased in order to enhance coaxiality between the rotor core 10 and the shaft 3, it results in increase in the inner diameters of the central holes 13b and 13c, and thus leads to reduction in rigidity of the rotor core 10.

In contrast, as illustrated in FIG. 9, since the rotor core 10 is configured so that the end edges E1 and E2 are located on the inclined plane 15a having the angle θ1, and the end edges E2 and E3 are located on the inclined plane 15b having the angle θ2 (>θ1), coaxiality between the rotor core 10 and the shaft 3 is enhanced without enlarging the central holes 13b and 13c too much. Thus, reduction in rigidity of the rotor core 10 can be suppressed.

In a state where the rotor core 10 and the shaft 3 are placed in the molding mold, resin is injected into the molding mold so that the interior of the central hole 13 and the interiors of the magnet insertion holes 11 of the rotor core 10 are filled with resin, thereby forming the resin parts 21 and 22, respectively.

A motor according to the fourth embodiment is the same as the motor 100 (FIG. 1) described in the first embodiment, except for the configuration of the rotor 1C.

In this example, the central hole 13 of the rotor core 10 includes three central holes 13a, 13b, and 13c having different inner diameters (that is, having different distances from the axis to the inner circumferential surfaces), but the central hole 13 may include four or more central holes having different inner diameters.

As described above, in the fourth embodiment, since the inner diameter L1 of the first central hole 13a of the rotor core 10 is larger than the outer diameter of the shaft 3, the shaft 3 is surrounded by the resin part 21 over the entire area of the rotor core 10 in the axial direction. Thus, the rotor core 10 and the shaft 3 can be integrated with each other by being molded with resin, and this eliminates the need for fixing the shaft 3 to the central hole 13 of the rotor core 10 by shrink fitting. As a result, thermal demagnetization of the permanent magnets 2 can be effectively suppressed.

Since the end edges E1 and E2 of the central holes 13a and 13b of the rotor core 10 are located on the inclined plane 15a inclined at the angle θ1 with respect to the axis C1, and the end edges E2 and E3 of the central holes 13b and 13c are located on the inclined plane 15b inclined at the angle θ2 (>θ1) with respect to the axis C1, it is possible to enhance coaxiality between the rotor core 10 and the shaft 3 in the molding process, and to suppress the reduction in rigidity of the rotor core 10.

Fifth Embodiment

Figure 10A:
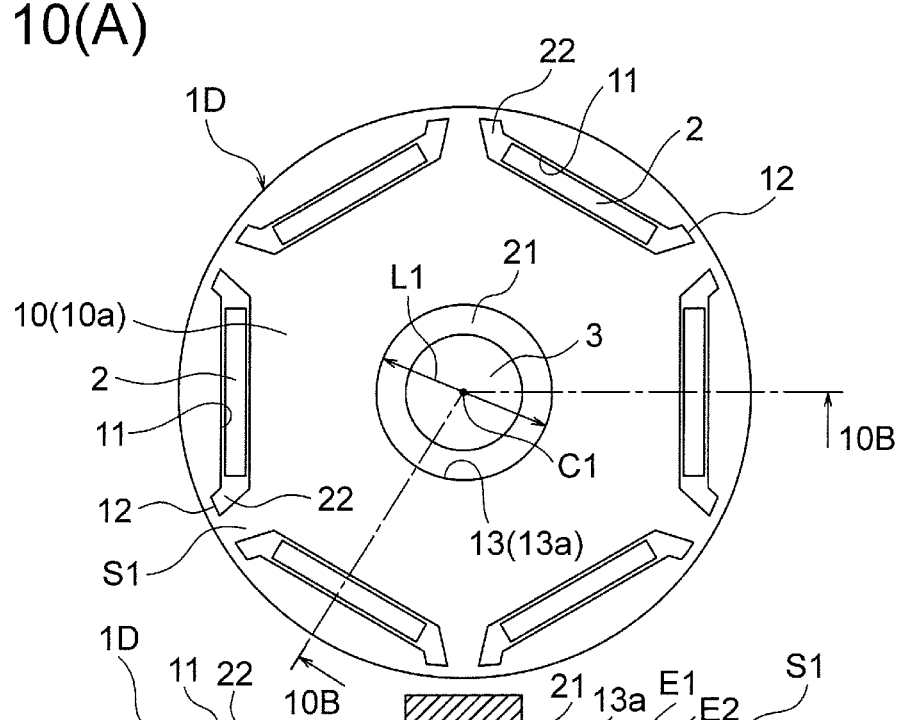
FIGS. 10(A), 10(B) and 10(C) are respectively a plan view, a sectional view, and a bottom view illustrating a rotor according to a fifth embodiment.
Figure 10B:
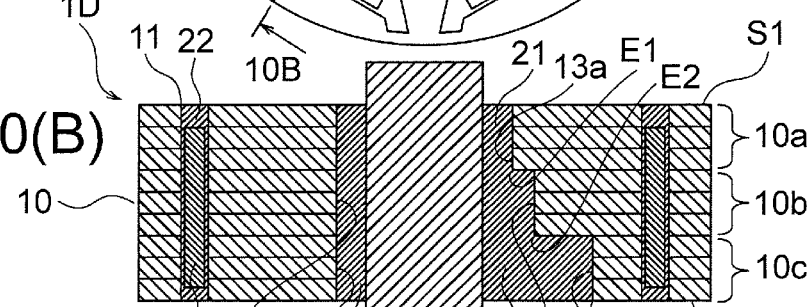
Figure 10C:
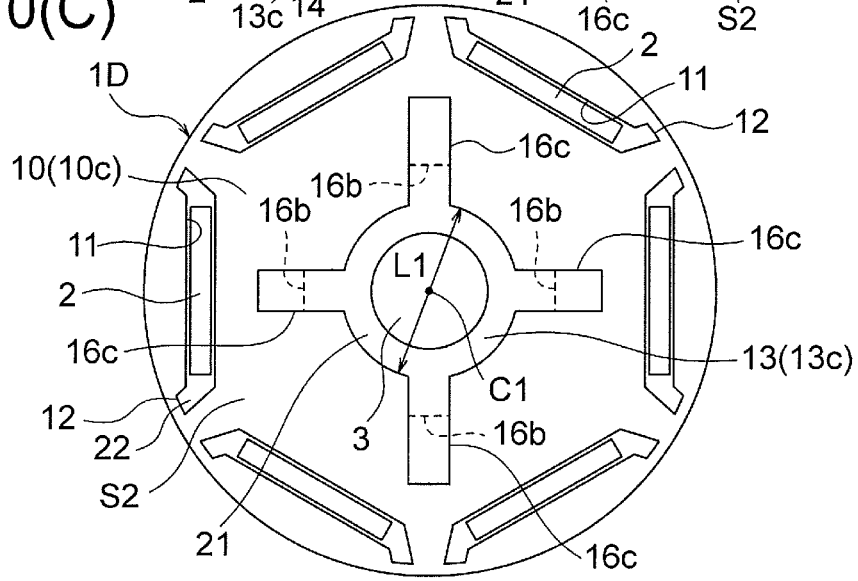

Next, a fifth embodiment of the present invention will be described. FIG. 10(A) is a plan view illustrating a rotor 1D according to the fifth embodiment. FIG. 10(B) is a sectional view, taken along a line 10B-10B illustrated in FIG. 10(A), as seen in a direction indicated by arrows. FIG. 10(C) is a bottom view illustrating the rotor 1D according to the fifth embodiment.

The rotor 1D according to the fifth embodiment includes a rotor core 10 having a configuration different from that of the rotor core 10 of the rotor 1 according to the first embodiment, as illustrated in FIG. 10(A). The rotor core 10 of the rotor 1D according to the fifth embodiment includes the magnet insertion holes 11 and the flux barriers 12 described in the first embodiment.

The rotor core 10 of the rotor 1D includes the first part 10a, the second part 10b, and the third part 10c from the first end face S1 toward the second end face S2, as illustrated in FIG. 10(B). The first part 10a includes the first central hole 13a, the second part 10b includes the second central hole 13b, and the third part 10c includes the third central hole 13c. The central holes 13a, 13b, and 13c constitute the central hole 13 in which the shaft 3 is inserted. The first central hole 13a is a circular hole having the inner diameter L1 larger than the outer diameter of the shaft 3, as in the fourth embodiment.

In above described first to fourth embodiments, all of the first central hole 13a, the second central hole 13b, and the third central hole 13c are circular holes. In contrast, in the fifth embodiment, the first central hole 13a is a circular hole, while each of the second central hole 13b and the third central hole 13c has a shape such that a plurality of groove parts 16 radially extend from a circular hole.

The second central hole 13b has a shape such that a plurality of groove parts 16b radially extend from a circular hole having the inner diameter L1, as illustrated in FIG. 10(C). The groove parts 16b are arranged at equal intervals in the circumferential direction about the axis C1. A distance from the axis C1 to a distal end of the groove part 16b of the second central hole 13b is larger than a distance (=L1/2) from the axis C1 to the inner circumferential surface of the first central hole 13a. In other words, the distance (maximum distance) from the axis C1 to the inner circumferential surface of the second central hole 13b is larger than the distance from the axis C1 to the inner circumferential surface of the first central hole 13a.

The third central hole 13c has a shape such that a plurality of groove parts 16c radially extend from the circular hole having the inner diameter L1. The groove parts 16c are arranged at equal intervals in the circumferential direction about the axis C1. A distance from the axis C1 to a distal end of the groove part 16c of the third central hole 13c is larger than the distance from the axis C1 to the distal end of the groove part 16b of the second central hole 13b. In other words, the distance (maximum distance) from the axis C1 to the inner circumferential surface of the third central hole 13c is larger than the distance from the axis C1 to the inner circumferential surface of the second central hole 13b.

The number of groove parts 16b of the second central hole 13b and the number of groove parts 16c of the third central hole 13c are equal to each other, and are each 4 in this example. However, the number is not limited to 4, but may be, for example, 1. Positions of the groove parts 16c in the circumferential direction are the same as positions of the groove parts 16b. In other words, the groove parts 16b of the second central hole 13b extend along the groove parts 16c of the third central hole 13c.

The end edge E1 of the first central hole 13a, and the end edge E2 of the second central hole 13b are located on the inclined plane 15a (FIG. 9) inclined at the angle θ1 with respect to the axis C1. The end edge E2 of the second central hole 13b, and the end edge E3 of the third central hole 13c are located on the inclined plane 15b (FIG. 9) inclined at the angle θ2 with respect to the axis C1. Each of the inclined planes 15a and 15b is a virtual plane about the axis C1 and is, for example, a part of a conical surface.

In the fifth embodiment, since the shaft 3 is surrounded by the resin part 21 over the entire area of the rotor core 10 in the axial direction, the shaft 3 and the rotor core 10 can be integrated with each other by being molded with resin, as in the fourth embodiment. This eliminates the need for fixing the shaft 3 to the central hole 13 of the rotor core 10 by shrink fitting, and thus thermal demagnetization of the permanent magnets 2 can be effectively suppressed.

In the molding process, the rotor core 10 and the shaft 3 are placed in the molding mold. In the rotor core 10 according to the fifth embodiment, the end edges E2 and E3 of the central holes 13b and 13c are located on the inclined plane 15b (FIG. 9), and thus abut against tapered parts of the molding mold when the rotor core 10 is placed in the molding mold so that the second end face S2 faces downward. This makes it possible to position the rotor core 10 in the molding mold and to enhance coaxiality between the rotor core 10 and the shaft 3. The tapered parts of the molding mold are located at a plurality of positions in the circumferential direction in correspondence with the groove parts 16b and 16c of the rotor core 10.

In a state where the rotor core 10 and the shaft 3 are placed in the molding mold, resin is injected into the molding mold so that the interior of the central hole 13 and the interiors of the magnet insertion holes 11 of the rotor core 10 are filled with the resin, thereby forming the resin parts 21 and 22, respectively.

Since the central holes 13b and 13c are shaped so that the pluralities of groove parts 16b and 16c extend from the circular hole as above, areas of the central holes 13b and 13c can be reduced (as compared to a case where the central holes 13b and 13c have circular shapes), while enabling positioning of the rotor core 10 in the molding mold. As a result, rigidity of the rotor core 10 can be enhanced.

By reducing the areas of the central holes 13b and 13c, a center of gravity of the rotor core 10 can be brought closer to a central position of the rotor core 10 in the axial direction. This makes it possible to suppress noise due to displacement of the center of gravity of the rotor core 10 from the central position of the rotor core 10.

Since both of the groove parts 16b and 16c are radially formed, the center of gravity of the rotor core 10 can be aligned with a central position of the rotor core 10 in a cross section perpendicular to the axis C1. This makes it possible to suppress noise due to displacement of the center of gravity of the rotor core 10 from the central position of the rotor core 10.

A motor according to the fifth embodiment is the same as the motor 100 (FIG. 1) described in the first embodiment, except for the configuration of the rotor 1D.

In this example, both of the second central hole 13b and the third central hole 13c are shaped so that the pluralities of groove parts 16b and 16c extend from the circular hole. However, the second central hole 13b may have a circular shape (see FIG. 3(B)), as long as the third central hole 13c includes the groove parts 16c.

In this example, the central hole 13 of the rotor core 10 includes three central holes 13a, 13b, and 13c having different distances from the axis to the inner circumferential surfaces, but the central hole 13 may include four or more central holes having different distances from the axis to the inner circumferential surfaces.

As described above, in the fifth embodiment, since the second central hole 13b and the third central hole 13c of the rotor core 10 are shaped so that the pluralities of groove parts 16b and 16c extend from the circular hole, the rotor core 10 can be positioned in the molding mold, coaxiality between the rotor core 10 and the shaft 3 can be enhanced, and reduction in rigidity of the rotor core 10 can be suppressed.

In the fifth embodiment, a configuration (FIG. 6(B)) in which the shaft 3 is fixed to the first central hole 13a of the rotor core 10 as in the third embodiment may be employed. Also in this case, when the rotor core 10 with the shaft 3 fixed thereto is placed in the molding mold, the end edges E2 and E3 abut against the tapered parts provided in the molding mold, and thus the rotor core 10 can be positioned in the molding mold.

In the fifth embodiment, a configuration in which the end edges E1, E2, and E3 of the rotor core 10 are located on the single inclined plane 15 (FIG. 7) as in the third embodiment may be employed.

Sixth Embodiment

Figure 11A:
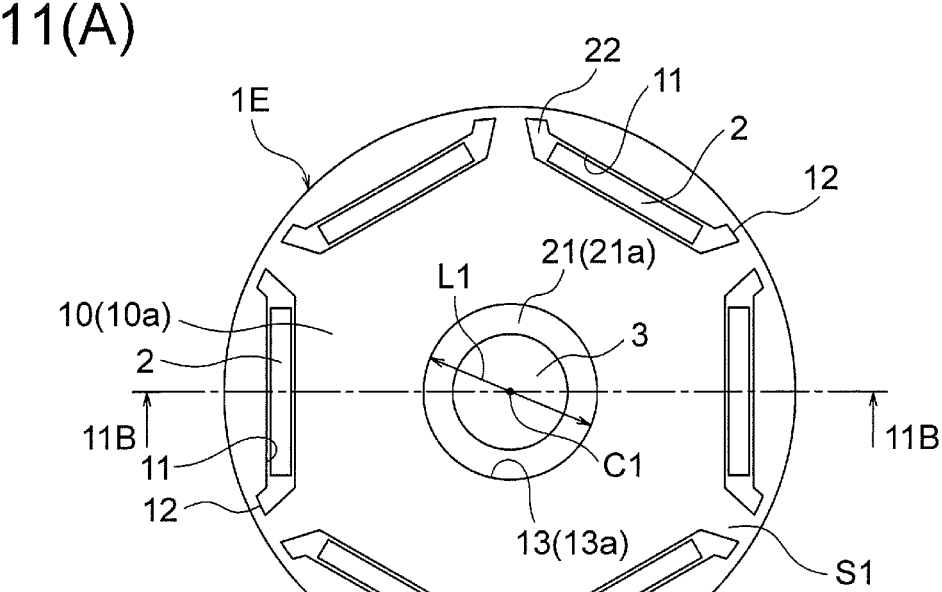
FIGS. 11(A), 11(B) and 11(C) are respectively a plan view, a sectional view, and a bottom view illustrating a rotor according to a sixth embodiment.
Figure 11B:
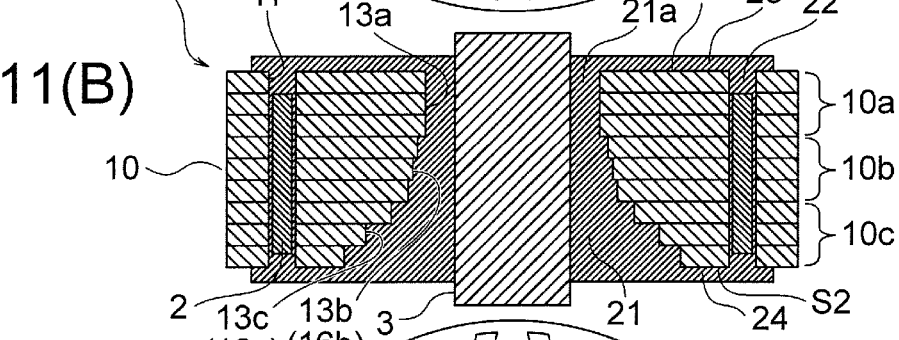
Figure 11C:
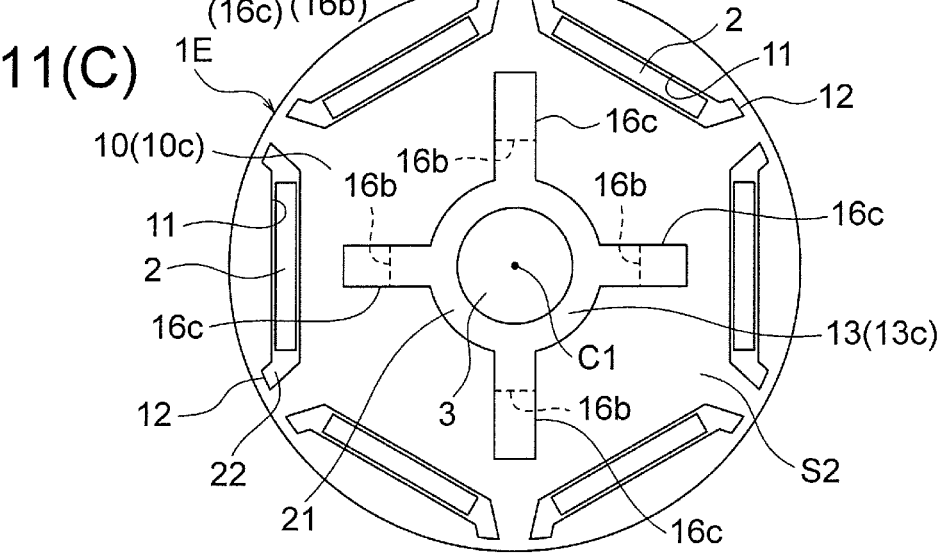

Next, a sixth embodiment of the present invention will be described. FIG. 11(A) is a plan view illustrating a rotor 1E according to the sixth embodiment. FIG. 11(B) is a sectional view, taken along a line 11B-11B illustrated in FIG. 11(A), as seen in a direction indicated by arrows. FIG. 11(C) is a bottom view illustrating the rotor 1E according to the sixth embodiment.

The rotor 1E according to the sixth embodiment includes a rotor core 10 having a configuration different from that of the rotor core 10 of the rotor 1 according to the first embodiment, as illustrated in FIG. 11(A). The rotor core 10 of the rotor 1E according to the sixth embodiment includes the magnet insertion holes 11 and the flux barriers 12 described in the first embodiment.

The rotor core 10 of the rotor 1E includes the first part 10a, the second part 10b, and the third part 10c from the first end face S1 toward the second end face S2, as illustrated in FIG. 11(B). The first part 10a includes the first central hole 13a, the second part 10b includes the second central hole 13b, and the third part 10c includes the third central hole 13c. The central holes 13a, 13b, and 13c constitute the central hole 13 in which the shaft 3 is inserted.

The first central hole 13a is a circular hole having the inner diameter L1 larger than the outer diameter of the shaft 3, as in the fourth and fifth embodiments. The second central hole 13b and the third central hole 13c are shaped so that pluralities of groove parts 16b and 16c radially extend from a circular hole (FIG. 11(C)), as in the fifth embodiment.

In the sixth embodiment, resin parts 23 and 24 (third resin parts) are formed on both end faces S1 and S2 of the rotor core 10 of the rotor 1E in the axial direction, as illustrated in FIG. 11(B). The resin parts 23 and 24 are formed integrally with the resin part 21 provided in the central hole 13 of the rotor core 10, and the resin parts 22 provided in the magnet insertion holes 11 of the rotor core 10. In this regard, the resin parts 23 and 24 are not illustrated in FIGS. 11(A) and 11(C). In this example, the resin parts 23 and 24 are formed on both end faces S1 and S2 of the rotor core 10, but it is also possible to form a resin part only on one end face.

Figure 12:
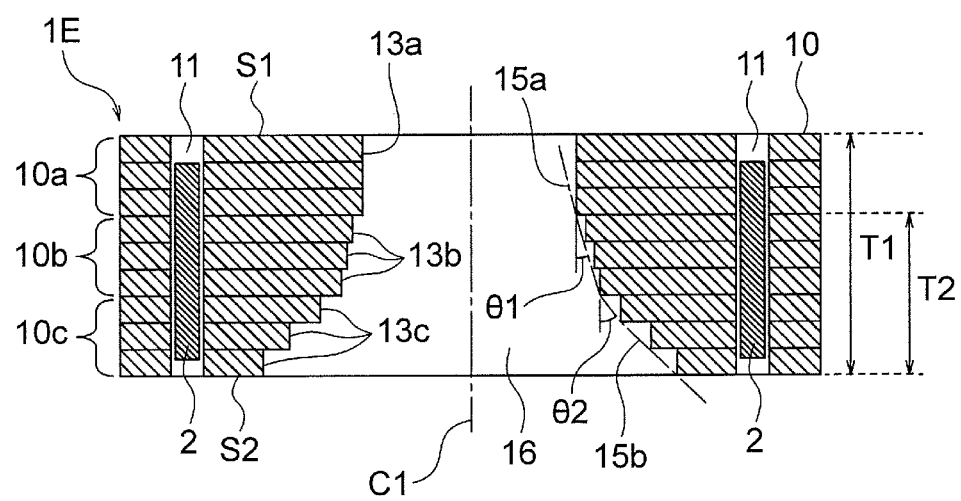
FIG. 12 is a sectional view illustrating a rotor core of the rotor according to the sixth embodiment.

FIG. 12 is a sectional view illustrating the rotor core 10 according to the sixth embodiment. The second central hole 13b is formed so that a distance from the axis C1 to the distal end of the groove part 16b increases stepwise toward the second end face S2. End edges of the second central hole 13b on the inner circumferential side are formed along an inclined plane 15a inclined at an angle θ1 with respect to the axis C1.

Likewise, the third central hole 13c is formed so that a distance from the axis C1 to the distal end of the groove part 16c increases stepwise toward the second end face S2. End edges of the third central hole 13c on the inner circumferential side are formed along an inclined plane 15b inclined at an angle θ2 with respect to the axis C1. The angle θ2 is larger than the angle θ1.

In the sixth embodiment, since the shaft 3 is surrounded by the resin part 21 over the entire area of the rotor core 10 in the axial direction, the shaft 3 and the rotor core 10 can be integrated with each other by being molded with resin, as in the fourth and fifth embodiments.

The molding process is as described in fourth and fifth embodiments. When the rotor core 10 is placed in the molding mold, the inclined plane 15b of the third central hole 13c of the rotor core 10 abuts against the tapered parts of the molding mold. Thus, the rotor core 10 can be positioned in the molding mold and coaxiality between the rotor core 10 and the shaft 3 can be enhanced.

In a state where the rotor core 10 and the shaft 3 are placed in the molding mold, resin is injected into the molding mold so that the interior of the central hole 13 and the interiors of the magnet insertion holes 11 of the rotor core 10 are filled with the resin, thereby forming the resin parts 21 and 22, respectively. The resin parts 23 and 24 are formed to cover both end faces of the rotor core 10 in the axial direction. The resin parts 21, 22, 23, and 24 are formed integrally with each other.

In FIG. 12, when T1 represents a length of the rotor core 10 in the axial direction, and T2 represents a sum of lengths of the second part 10b and the third part 10c of the rotor core 10 in the axial direction (that is, a sum of lengths of the second central hole 13b and the third central hole 13c in the axial direction), T2>T1/2 is satisfied. Since the central hole 13 has an inclination, the second part 10b and the third part 10c are mounted in a lower mold (for example, a lower mold 7 illustrated in FIG. 16) of the molding mold. In contrast, the first part 10a is mounted in an upper mold (for example, an upper mold 8 illustrated in FIG. 16) of the molding mold.

When the upper mold is pulled out of the lower mold after molding, adhesion force between the rotor 1E and the lower mold is stronger than adhesion force between the rotor 1E and the upper mold, since above described T2>T1/2 is satisfied. Thus, the rotor 1E is not lifted by being attached to the upper mold, but remains in the lower mold. Thus, workability in molding can be enhanced.

A motor according to the sixth embodiment is the same as the motor 100 (FIG. 1) described in the first embodiment, except for the configuration of the rotor 1E.

In this example, the inner circumferential surface of the central hole 13 of the rotor core 10 has a multi-stepped shape as illustrated in FIG. 12, but the inner circumferential surface of the central hole 13 is not limited to such a multi-stepped shape. More specifically, the end edges E1, E2, and E3 of the central holes 13a, 13b, and 13c may form the inclined plane 15 (FIG. 7) or the inclined planes 15a and 15b (FIG. 9).

In this example, the central hole 13 of the rotor core 10 includes three central holes 13a, 13b, and 13c having different distances from the axis to the inner circumferential surfaces, but the central hole 13 may include four or more central holes having different distances from the axis to the inner circumferential surfaces.

As described above, in the sixth embodiment, since the resin parts 23 and 24 are formed to cover both end faces S1 and S2 of the rotor core 10 in the axial direction, rigidity of the rotor 1E can be enhanced. In a case where bearings (for example, bearings 31 and 32 illustrated in FIG. 15) rotatably supporting the shaft 3 are mounted on both sides of the rotor 1E in the axial direction, the resin parts 23 and 24 serve as spacers for positioning the bearings. Thus, manufacturing cost of the motor can be reduced.

It is also possible to provide a resin part on at least one end face of the rotor core 10 in the axial direction in the rotor 1B (FIG. 6(B)) having the shaft 3 fitted into the first central hole 13a of the rotor core 10 as described in the third embodiment. It is also possible to provide a resin part on at least one end face of the rotor core 10 in the rotor 1C in which all the central holes 13a, 13b, and 13c of the rotor core 10 have circular shapes as described in the fourth embodiment.

A configuration in which the length T1 of the rotor core 10 in the axial direction, and the sum T2 of lengths of the second part 10b and the third part 10c in the axial direction satisfy T2>T1/2 as described with reference to FIG. 12 is also applicable to the third embodiment (FIG. 6), the fourth embodiment (FIG. 8), and the fifth embodiment (FIG. 10).

Seventh Embodiment

Figure 13A:
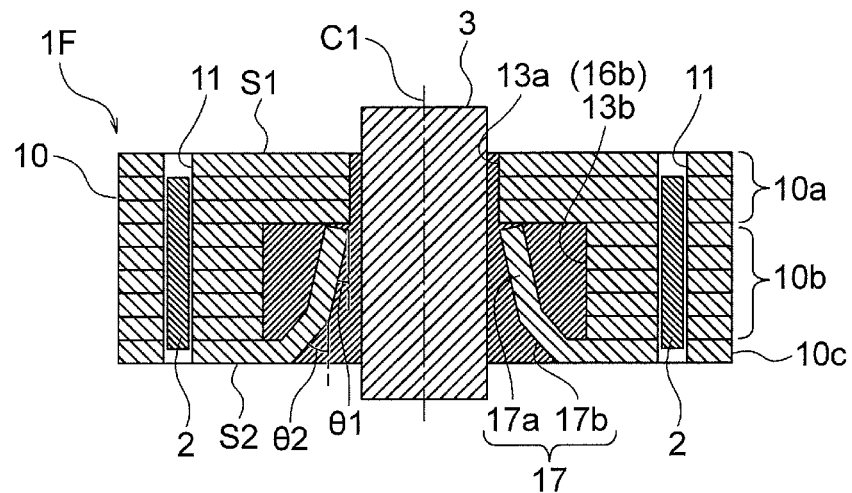
FIGS. 13(A) and 13(B) are respectively a sectional view and a bottom view of a rotor according to a seventh embodiment.
Figure 13B:
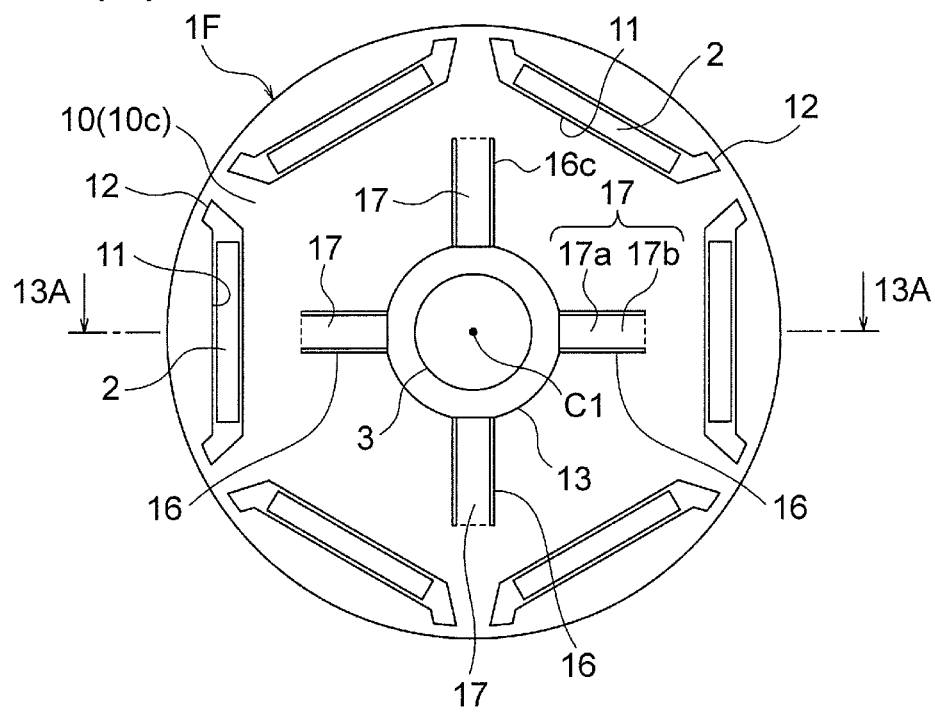

Next, a seventh embodiment of the present invention will be described. FIG. 13(A) is a sectional view illustrating a rotor 1F according to the seventh embodiment. FIG. 13(B) is a bottom view illustrating the rotor 1F according to the seventh embodiment. In this regard, FIG. 13(A) corresponds to a sectional view taken along a line 13A-13A illustrated in FIG. 13(B).

The rotor 1F according to the seventh embodiment includes a rotor core 10 having a configuration different from that of the rotor core 10 of the rotor 1 according to the first embodiment, as illustrated in FIG. 13(A). The rotor core 10 of the rotor 1F according to the seventh embodiment includes the magnet insertion holes 11 and the flux barriers 12 described in the first embodiment.

The rotor core 10 of the rotor 1F includes the first part 10a, the second part 10b, and the third part 10c from the first end face S1 toward the second end face S2. The first part 10a includes the first central hole 13a, the second part 10b includes the second central hole 13b, and the third part 10c includes the third central hole 13c. The central holes 13a, 13b, and 13c constitute the central hole 13 in which the shaft 3 is inserted.

As illustrated in FIG. 13(B), the first central hole 13a is a circular hole having the inner diameter L1 larger than the outer diameter of the shaft 3, as in the fourth and fifth embodiments. The second central hole 13b and the third central hole 13c are shaped so that pluralities of groove parts 16b and 16c radially extend from a circular hole, as in the fifth embodiment. The number of the groove parts 16b and the number of the groove parts 16c are each 4, but are not limited thereto.

In the seventh embodiment, the third part 10c of the rotor core 10 includes extending parts 17 extending inward in the radial direction. The extending parts 17 extend inward in the radial direction (that is, toward the axis C1) within the groove parts 16c of the third central hole 13c, and are bent toward the first end face S1 side.

As illustrated in FIG. 13(A), the extending part 17 includes an inclined part 17a located on an inner side (closer to the axis C1) in the radial direction, and an inclined part 17b located on an outer side of the inclined part 17a in the radial direction. The inclined part 17a is inclined at an angle θ1 with respect to the axis C1, and the inclined part 17b is inclined at an angle θ2 (>θ1) with respect to the axis C1. A distal end of the inclined part 17a desirably abuts against a lower surface (a surface on the second end face S2 side) of the first part 10a of the rotor core 10.

In this example, the extending part 17 includes two inclined parts 17a and 17b having different inclination angles, but the extending part 17 may include a single inclined part.

In the seventh embodiment, the shaft 3 is surrounded by a resin part 21 over the entire area of the rotor core 10 in the axial direction, and thus the shaft 3 and the rotor core 10 can be integrated with each other by being molded with resin, as in the fourth to sixth embodiments.

The molding process is as described in the fourth to sixth embodiments. When the rotor core 10 is placed in the molding mold, the inclined parts 17b of the extending parts 17 of the rotor core 10 abut against the tapered parts of the molding mold. Thus, the rotor core 10 can be positioned in the molding mold, and coaxiality between the rotor core 10 and the shaft 3 can be enhanced.

In a state where the rotor core 10 and the shaft 3 are placed in the molding mold, resin is injected into the molding mold so that the interior of the central hole 13 and the interiors of the magnet insertion holes 11 of the rotor core 10 are filled with the resin, thereby forming the resin parts 21 and 22, respectively. The resin parts 23 and 24 (FIG. 11(B)) described in the sixth embodiment may be formed to cover both end faces of the rotor core 10 in the axial direction.

As above, since the inclined parts 17b of the extending parts 17 abut against the tapered parts of the molding mold, the central hole 13 of the rotor core 10 need not have a multi-stepped shape (see FIG. 12). Thus, the number of kinds of electromagnetic steel sheets constituting the rotor core 10 can be reduced, and manufacturing cost can be reduced.

The second part 10b and the third part 10c of the rotor core 10 can have the same configuration, except that the third part 10c includes the extending parts 17.

The extending parts 17 desirably do not project inward into the first central hole 13a in the radial direction. This is in order to inhibit the extending parts 17 from hampering flow of resin when the resin is injected into the molding mold.

In this example, the extending part 17 has a shape extending inward in the radial direction within the groove part 16c, and is bent toward the first end face S1 side. However, the extending part 17 is not limited to such a shape. It is also possible that the extending parts 17 extend inward in the radial direction from the inner circumferential surface of the circular third central hole 13c (see FIG. 3(C)) having no groove part 16c, and are bent in the axial direction.

A motor according to the seventh embodiment is the same as the motor 100 (FIG. 1) described in the first embodiment, except for the configuration of the rotor 1F.

As described above, in the seventh embodiment, the third part 10c of the rotor core 10 includes the extending parts 17 extending inward in the radial direction and inclined in the axial direction. Thus, when the rotor core 10 is placed in the molding mold, the inclined parts 17b of the extending parts 17 abut against the tapered parts of the molding mold, and thus the rotor core 10 can be positioned in the molding mold. This eliminates the need for forming a multi-stepped shape in the central hole 13 of the rotor core 10, and thus the number of kinds of electromagnetic steel sheets constituting the rotor core 10 can be reduced. Thus, manufacturing cost can be reduced.

Eighth Embodiment

Figure 14:
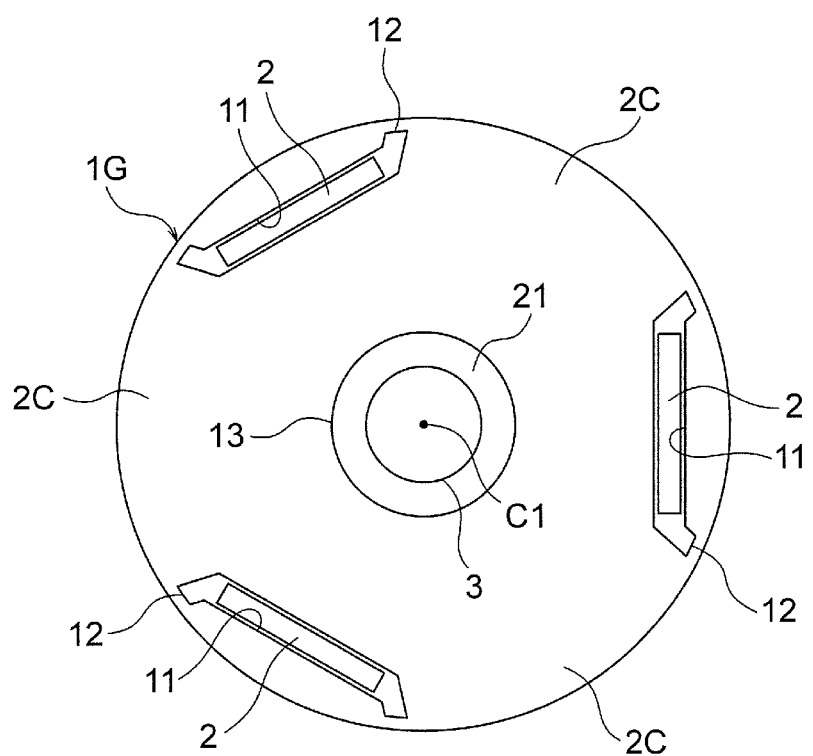
FIG. 14 is a top view illustrating a rotor according to an eighth embodiment.

Next, an eighth embodiment of the present invention will be described. FIG. 14 is a plan view illustrating a rotor 1G according to the eighth embodiment.

The rotor 1G according to the eighth embodiment is a consequent-pole rotor, as illustrated in FIG. 14. More specifically, the rotor 1G includes three magnet magnetic poles (first magnetic poles) and three pseudo-magnetic poles (second magnetic poles) alternately arranged in the circumferential direction. The magnet magnetic poles are formed by the permanent magnets 2 disposed in the magnet insertion holes 11. The pseudo-magnetic poles are formed by regions 2C located between adjacent permanent magnets 2 in a rotor core 10. The number of magnetic poles of the rotor 1G is not limited to 6.

The rotor core 10 of the rotor 1G includes the magnet insertion holes 11 and the flux barriers 12 described in the first embodiment. In the rotor core 10 of the rotor 1G, the inner diameter of the first central hole 13a is larger than the outer diameter of the shaft 3, as described in the fourth embodiment. More specifically, the shaft 3 is surrounded by the resin part 21 over the entire area of the rotor core 10 in the axial direction. Therefore, the rotor core 10 and the shaft 3 can be integrated with each other by being molded with resin.

The consequent-pole motor has no magnet on the pseudo-magnetic poles (regions 2C), and therefore has characteristics such that magnetic flux passing through the pseudo-magnetic poles is likely to flow to the shaft 3 (that is, magnetic flux leakage is likely to occur). In the eighth embodiment, provision of the resin part 21 between the rotor core 10 and the shaft 3 effectively suppresses the leakage magnetic flux flowing to the shaft 3 in the consequent-pole rotor 1G.

End edges along the inclined plane 15 illustrated in FIG. 7, or end edges along the inclined planes 15a and 15b illustrated in FIG. 9 or 12 are desirably provided on the second end face S2 side of the central hole 13 of the rotor core 10. Alternatively, the extending parts 17 illustrated in FIG. 13(A) may be provided.

It is desirable to provide the resin parts 22 in the magnet insertion holes 11, in addition to the resin part 21 provided in the central hole 13 of the rotor core 10. The resin parts 23 and 24 may be provided on both end faces S1 and S2, respectively, of the rotor core 10, as illustrated in FIG. 11(B).

A motor according to the eighth embodiment is the same as the motor 100 (FIG. 1) described in the first embodiment, except for the configuration of the rotor 1G.

As described above, in the eighth embodiment, the rotor 1G is the consequent-pole rotor, and includes the resin part 21 provided between the shaft 3 and the central hole 13 of the rotor core 10, and thus the leakage magnetic flux flowing to the shaft 3, which is likely to occur in the consequent-pole rotor, can be effectively suppressed.

The consequent-pole rotor described in the eighth embodiment is also applicable to the rotor according to each of the first to seventh embodiments.

(Motor)

Next, a motor to which the rotor according to each of the embodiments is applicable will be described. FIG. 15 illustrates a motor 100 including the rotor (in this example, particularly, the rotor 1E according to the sixth embodiment) including the resin part 21 provided between the shaft 3 and the central hole 13 of the rotor core 10, as described in the fourth to eighth embodiments.

The motor 100 includes the annular stator 5 surrounding the rotor 1E, as described with reference to FIG. 1. The mold resin part 55 made of thermoplastic resin such as PBT or PPS is provided to cover the stator 5 from outside. It is also possible to fix the stator 5 inside a shell by shrink fitting, instead of providing the mold resin part 55 outside the stator 5.

The mold resin part 55 includes a bearing support part 56 on its one side (right side in FIG. 15) in the axial direction, and an opening part 57 on the other side (left side in FIG. 15). The rotor 1E is inserted through the opening part 57 into inside of the stator 5.

A metallic bracket 34 is attached to the opening part 57 of the mold resin part 55. One bearing 32 for supporting the shaft 3 is held by the bracket 34. A cap 33 for preventing water or the like from entering the bearing 32 is mounted on an outer side of the bearing 32. The other bearing 31 for supporting the shaft 3 is held by the bearing support part 56 of the mold resin part 55.

The shaft 3 protrudes from the stator 5 to the left in FIG. 15, and a fan impeller, for example, is mounted at a tip on the projection side of the shaft 3. Accordingly, the projection side (left side in FIG. 15) of the shaft 3 will be referred to as a "load side", and the opposite side (right side in FIG. 15) will be referred to as a "counter-load side".

A board 6 is disposed on the counter-load side of the stator 5. A driving circuit for driving the motor 100, and a magnetic sensor 61 are mounted on the board 6. The magnetic sensor 61 faces a sensor magnet 18 mounted on the rotor 1E. The sensor magnet 18 is mounted at, for example, one end (in this example, the resin part 24) of the rotor 1E in the axial direction. The magnetic sensor 61 detects a position (rotational position) of the rotor 1E in the circumferential direction based on a change in magnetic flux (N/S) from the sensor magnet 18, and outputs a detection signal.

Lead wires 63 are arranged on the board 6. The lead wires 63 include power supply lead wires for supplying power to the coils 4 of the stator 5, and sensor lead wires for transmitting a signal from the magnetic sensor 61 to outside. A lead wire lead-out component 64 for drawing the lead wires 63 outside is mounted on an outer periphery of the mold resin part 55.

A configuration of the motor 100 (FIG. 1) including the rotor 1 (1A, 1B) described in each of the first to third embodiments is the same as that of the motor 100 illustrated in FIG. 15, except that the shaft 3 is fitted into the central hole 13 of the rotor core 10 in each of the first to third embodiments.

(Manufacturing Process of Rotor)

Next, a manufacturing process of the rotor will be described. The manufacturing process of the rotor 1E described in the sixth embodiment will be particularly described herein. The rotor 1E is manufactured by integrally molding the rotor core 10 and the shaft 3 with resin. The rotor core 10 is formed by stacking electromagnetic steel sheets and integrally fixing the sheets by crimping. The permanent magnets 2 are inserted into the magnet insertion holes 11.

Figure 16:
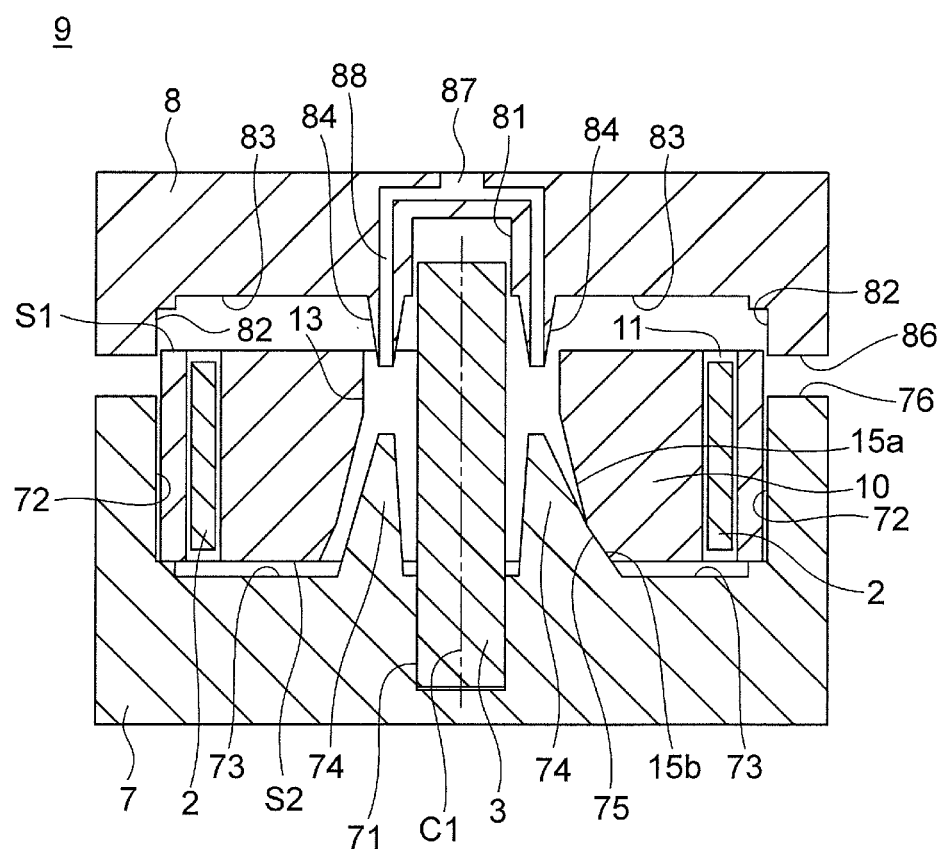
FIG. 16 is a diagram for explaining a manufacturing process of a rotor.

FIG. 16 is a sectional view illustrating a molding mold 9 for integrally molding the rotor core 10 and the shaft 3 with resin. The molding mold 9 includes a lower mold (fixed mold) 7 and an upper mold (movable mold) 8. The lower mold 7 and the upper mold 8 have mold-mating surfaces 76 and 86 facing each other.

The lower mold 7 includes a shaft insertion hole 71 in which an end (in this example, a lower end) of the shaft 3 is inserted, a rotor core housing part 72 in which the rotor core 10 is housed, and protrusions 74 entering into the central hole 13 of the rotor core 10. The protrusions 74 project upward from a bottom surface 73 of the rotor core housing part 72. The protrusions 74 are disposed at a plurality of positions corresponding to the groove parts 16c of the central hole 13 of the rotor core 10.

The lower mold 7 further includes tapered parts 75 abutting against the inclined plane 15b (FIG. 12) of the rotor core 10. The tapered parts 75 are desirably arranged at equal intervals in the circumferential direction about a center of the shaft insertion hole 71 (the center of the shaft 3), and are located at a plurality of positions corresponding to the groove parts 16c (FIG. 11(C)) of the third central hole 13c of the rotor core 10.

The upper mold 8 includes a shaft insertion hole 81 in which an end (in this example, an upper end) of the shaft 3 is inserted, a rotor core housing part 82 in which the rotor core 10 is housed, and protrusions 84 entering into the central hole 13 of the rotor core 10. The protrusions 84 project downward from a top surface 83 of the rotor core housing part 82. Gates 88 through which resin is poured is formed in the protrusions 84. The gates 88 are connected to a sprue 87 formed at a center of the upper mold 8.

In the molding process, the shaft 3 is inserted into the shaft insertion hole 71 of the lower mold 7. Accordingly, the shaft 3 is positioned. The rotor core 10 is inserted into the rotor core housing part 72 so that the second end face S2 faces downward.

At this time, the tapered parts 75 of the lower mold 7 abut against the inclined plane 15b of the rotor core 10. Thus, the rotor core 10 is positioned in the radial direction, and the central axis of the rotor core 10 is aligned with the central axis of the shaft 3.

Figure 17:
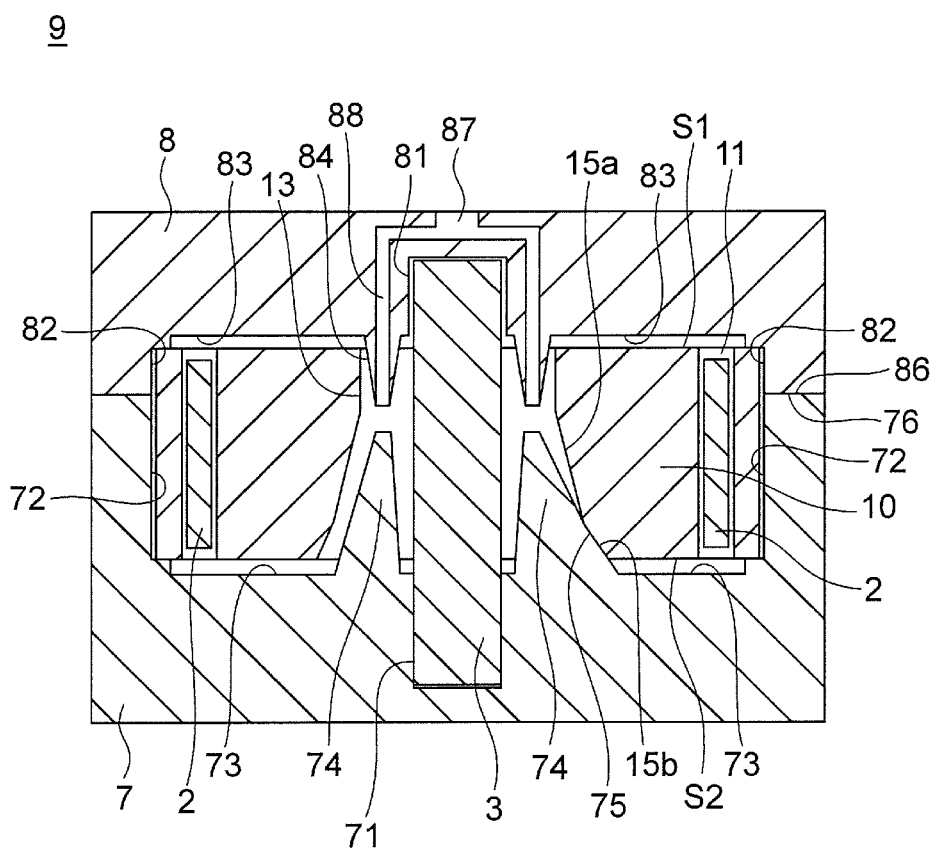
FIG. 17 is another diagram for explaining the manufacturing process of the rotor.

Then, the upper mold 8 is moved downward onto the lower mold 7 to cause the mold-mating surfaces 76 and 86 to abut against each other, as illustrated in FIG. 17. Thus, a cavity is formed between the upper mold 8 and the lower mold 7. In this state, the molding mold 9 is heated, and resin such as PBT is injected via the sprue 87 and the gates 88.

The resin injected from the gates 88 fills the interiors of the central hole 13 and the magnet insertion holes 11 of the rotor core 10 inserted into the rotor core housing parts 72 and 82. The resin further fills a space between the bottom surface 73 and the rotor core 10 and a space between the top surface 83 and the rotor core 10.

After the resin is injected into the molding mold 9 as above, the molding mold 9 is cooled. Thus, the resin is hardened. More specifically, the resin hardened in the central hole 13 of the rotor core 10 turns into the resin part 21 illustrated in FIG. 11(B). The resin hardened in the magnet insertion holes 11 turns into the resin parts 22. The resin hardened in the space between the bottom surface 73 and the rotor core 10 turns into the resin part 24, and the resin hardened in the space between the top surface 83 and the rotor core 10 turns into the resin part 23.

As above, the rotor core 10 and the shaft 3 are integrated with each other with the resin, and the rotor 1E is formed. Then, the upper mold 8 is lifted, and the rotor 1E is taken out of the lower mold 7. The manufacturing of the rotor 1E is thus completed.

In manufacturing the motor 100, the stator 5 is manufactured by winding the coils 4 around the stator core 50 illustrated in FIG. 15 via the insulators 53. Then, the stator 5 is placed in the molding mold, resin is injected into the molding mold, and the molding mold is heated to form the mold resin part 55 covering the stator 5.

Then, the bearings 31 and 32 are mounted on the shaft 3 of the rotor 1E, and the rotor 1E is inserted through the opening part 57 of the mold resin part 55. Then, the bracket 34 is attached to the opening part 57. The cap 33 is mounted on the outer side of the bracket 34. The manufacturing of the motor 100 is thus completed.

In the above described manufacturing process of the rotor 1E, the inclined plane 15b formed in the central hole 13 of the rotor core 10 abuts against the tapered parts 75 of the lower mold 7. Thus, the rotor core 10 can be positioned in the radial direction, and coaxiality between the rotor core 10 and the shaft 3 can be enhanced. Since the coaxiality between the rotor core 10 and the shaft 3 is enhanced, the high-performance motor 100 can be manufactured.

Although the manufacturing process of the rotor 1E according to the sixth embodiment is described herein, the rotor according to each of the third to eighth embodiments includes the inclined plane in the central hole 13, and thus coaxiality between the rotor core 10 and the shaft 3 can be enhanced in the molding process.

(Air Conditioning Apparatus)

Figure 18:
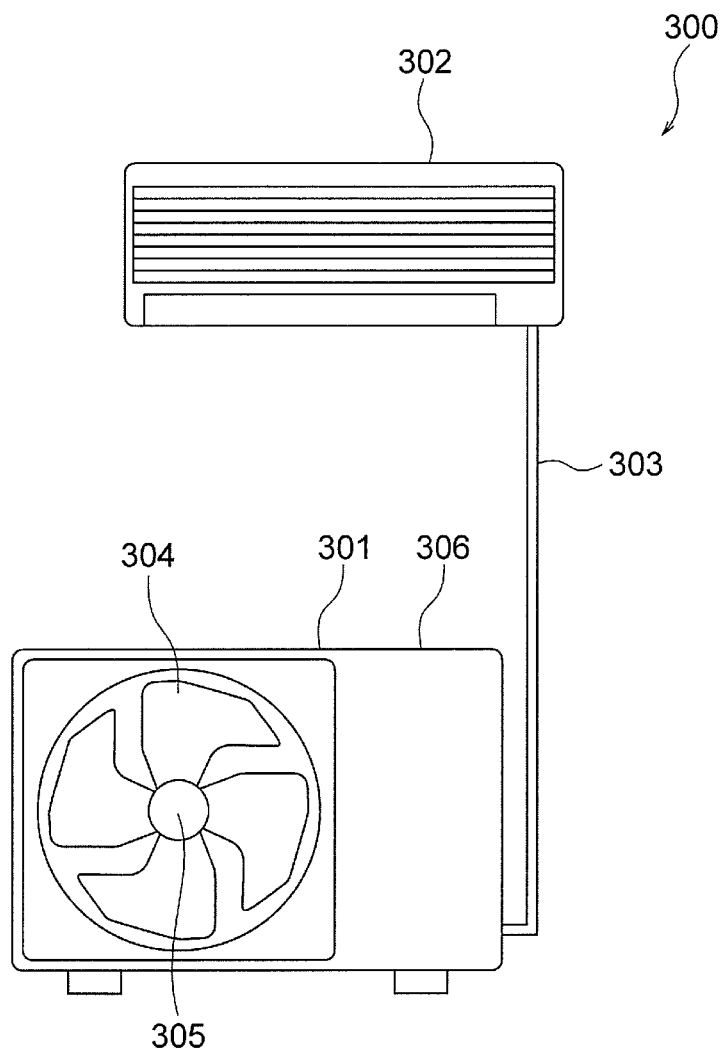
FIG. 18 is a schematic diagram illustrating an air conditioning apparatus including the motor to which the rotor according to each of the embodiments is applied.

Next, an air conditioning apparatus to which the motor according to each of the above described embodiments is applied will be described. FIG. 18 is a diagram illustrating a configuration of an air conditioning apparatus 300 to which the motor 100 according to each of the embodiments is applicable. The air conditioning apparatus 300 includes an outdoor unit 301, an indoor unit 302, and a refrigerant pipe 303 connecting these units to each other. The outdoor unit 301 includes an outdoor fan 305 as a fan.

Figure 19B:
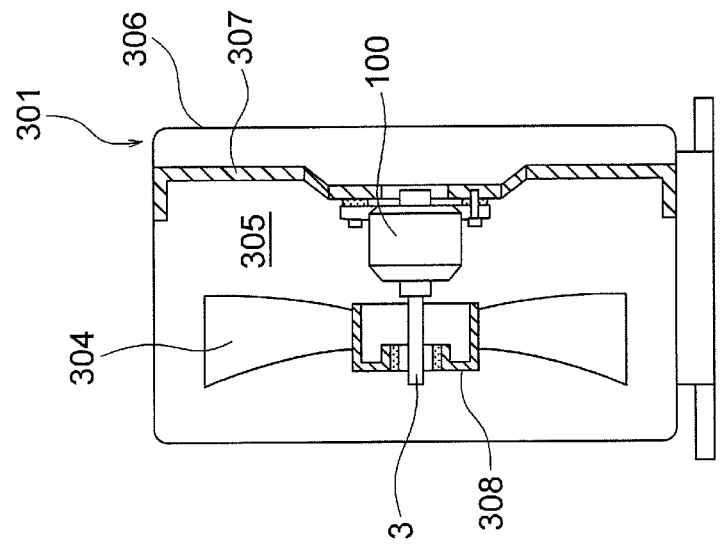
FIGS. 19(A) and 19(B) are respectively a front view and a sectional view illustrating an outdoor unit of the air conditioning apparatus in FIG. 18.
Figure 19A:
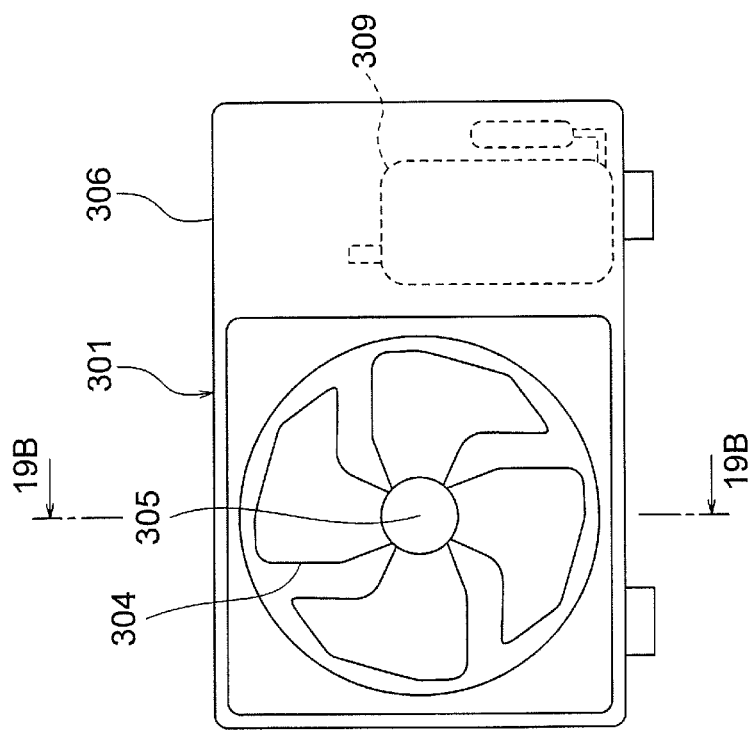

FIG. 19(A) is a front view illustrating a configuration of the outdoor unit 301. FIG. 19(B) is a sectional view taken along a line 19B-19B illustrated in FIG. 19(A). The outdoor unit 301 includes a housing 306, and a frame 307 fixed to the housing 306. The motor 100 as a driving source for the outdoor fan 305 is fixed to the frame 307. An impeller 304 is attached to the shaft 3 of the motor 100 via a hub 308.

The motor 100, the hub 308, and the impeller 304 constitute the outdoor fan 305. FIG. 19(A) also illustrates a compressor 309 for compressing refrigerant. When the rotor 1 (FIG. 1) of the motor 100 rotates, the impeller 304 attached to the shaft 3 rotates and blows air outdoors. When the air conditioning apparatus 300 operates in a cooling mode, heat dissipated by a condenser (not illustrated) condensing the refrigerant compressed by the compressor 309 is released outdoors by the air blown by the outdoor fan 305.

The motor 100 according to each of above described embodiments is configured to suppress demagnetization of the permanent magnets 2. Hence, by using the motor 100 as a power source for the outdoor fan 305, operating efficiency of the air conditioning apparatus 300 can be enhanced for a long period of time, and energy consumption can be reduced. The same applies to a case where each of the motors according to other embodiments is used as the power source for the outdoor fan 305.

Although the motor described in each of the embodiments is used for the outdoor fan 305 of the outdoor unit 301 in this example, the motor in each of the embodiments may also be used for the fan of the indoor unit 302.

While desirable embodiments of the present invention have been described in detail above, the present invention is not limited thereto, and various improvements or modifications may be made without departing from the gist of the present invention.

What is claimed is:

1. A rotor comprising:
   a shaft extending in a direction of an axis;
   a rotor core having a central hole in which the shaft is inserted; and
   a permanent magnet mounted in the rotor core,
   wherein the central hole has a first central hole, a second central hole, and a third central hole in the direction of the axis,
   wherein a distance from the axis to an inner circumferential surface of the third central hole is larger than a distance from the axis to an inner circumferential surface of the second central hole,
   wherein the distance from the axis to the inner circumferential surface of the second central hole is larger than a distance from the axis to an inner circumferential surface of the first central hole, and
   wherein an end of the permanent magnet in the direction of the axis is located at a position corresponding to the third central hole of the rotor core.

2. The rotor according to claim 1, further comprising a first resin part provided in the second central hole and the third central hole.

3. The rotor according to claim 1, wherein the shaft is fitted into the first central hole.

4. The rotor according to claim 1, wherein the first central hole is located at each end of the rotor core in the direction of the axis.

5. The rotor according to claim 1, wherein the third central hole, the second central hole, and the first central hole are arranged in order from one end side of the rotor core in the direction of the axis.

6. The rotor according to claim 5, wherein at least two of:
   a first end edge of the inner circumferential surface of the first central hole on the one end side,
   a second end edge of the inner circumferential surface of the second central hole on the one end side, and
   a third end edge of the inner circumferential surface of the third central hole on the one end side
   are located on an inclined plane inclined with respect to the direction of the axis.

7. The rotor according to claim 6, wherein the first end edge and the second end edge are located on an inclined plane inclined at an angle θ1 with respect to the direction of the axis, and
   wherein the second end edge and the third end edge are located on an inclined plane inclined at an angle θ2 with respect to the direction of the axis, the angle θ2 being larger than the angle θ1.

8. The rotor according to claim 5, wherein the third central hole has a hole having a circular shape about the axis, and a groove part extending outward in a radial direction from the hole.

9. The rotor according to claim 8, wherein the groove part of the third central hole has a plurality of groove parts arranged at equal intervals in a circumferential direction about the axis of the hole.

10. The rotor according to claim 8, wherein the second central hole has a hole having a circular shape about the axis, and a groove part extending along the groove part of the third central hole from the hole, and
wherein a distance from the axis to a distal end of the groove part of the second central hole is smaller than a distance from the axis to a distal end of the groove part of the third central hole.

11. The rotor according to claim 5, wherein a length T1 of the rotor core in the direction of the axis, and a sum T2 of lengths of the second central hole and the third central hole in the direction of the axis satisfy a relation T2>T1/2.

12. The rotor according to claim 5, wherein an inner diameter of the first central hole is larger than an outer diameter of the shaft.

13. The rotor according to claim 5, wherein the rotor core has a magnet insertion hole formed on an outer side of the central hole in a radial direction, and
wherein the rotor further comprises a second resin part provided in the magnet insertion hole.

14. The rotor according to claim 5, further comprising a third resin part to cover at least one end face of the rotor core in the direction of the axis.

15. The rotor according to claim 5, wherein the rotor core has an extending part extending from the third central hole toward the axis, and
wherein the extending part has an inclined part inclined with respect to the axis.

16. The rotor according to claim 1, wherein the rotor comprises a consequent-pole rotor having a first magnetic pole formed by a permanent magnet, and a second magnetic pole formed by the rotor core.

17. A motor comprising a rotor, and a stator provided to surround the rotor,
the rotor comprising:
a shaft extending in a direction of an axis;
a rotor core having a central hole in which the shaft is inserted; and
a permanent magnet mounted in the rotor core,
wherein the central hole has a first central hole, a second central hole, and a third central hole in the direction of the axis,
wherein a distance from the axis to an inner circumferential surface of the third central hole is larger than a distance from the axis to an inner circumferential surface of the second central hole,
wherein the distance from the axis to the inner circumferential surface of the second central hole is larger than a distance from the axis to an inner circumferential surface of the first central hole, and
wherein an end of the permanent magnet in the direction of the axis is located at a position corresponding to the third central hole of the rotor core.

18. An air conditioning apparatus comprising an outdoor unit, an indoor unit, and a refrigerant pipe connecting the outdoor unit to the indoor unit,
at least one of the outdoor unit and the indoor unit comprising a fan,
the fan comprising a blade, and a motor to rotate the blade,
the motor comprising a rotor, and a stator provided to surround the rotor,
the rotor comprising:
a shaft extending in a direction of an axis;
a rotor core having a central hole in which the shaft is inserted; and
a permanent magnet mounted in the rotor core,
wherein the central hole has a first central hole, a second central hole, and a third central hole in the direction of the axis,
wherein a distance from the axis to an inner circumferential surface of the third central hole is larger than a distance from the axis to an inner circumferential surface of the second central hole,
wherein the distance from the axis to the inner circumferential surface of the second central hole is larger than a distance from the axis to an inner circumferential surface of the first central hole, and
wherein an end of the permanent magnet in the direction of the axis is located at a position corresponding to the third central hole of the rotor core.

* * * * *